US010599142B2

(12) United States Patent
Kobayashi et al.

(10) Patent No.: US 10,599,142 B2
(45) Date of Patent: Mar. 24, 2020

(54) DISPLAY DEVICE AND CONTROL METHOD FOR DISPLAY DEVICE

(71) Applicant: SEIKO EPSON CORPORATION, Tokyo (JP)

(72) Inventors: Shinichi Kobayashi, Azumino (JP); Masahide Takano, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/863,106

(22) Filed: Jan. 5, 2018

(65) Prior Publication Data

US 2018/0217590 A1 Aug. 2, 2018

(30) Foreign Application Priority Data

Jan. 27, 2017 (JP) ................... 2017-012756

(51) Int. Cl.
*H04N 7/18* (2006.01)
*G05D 1/00* (2006.01)
*G05D 1/10* (2006.01)

(52) U.S. Cl.
CPC .......... *G05D 1/0038* (2013.01); *H04N 7/185* (2013.01); *G05D 1/102* (2013.01)

(58) Field of Classification Search
CPC ....... H04N 7/185; G05D 1/0038; G05D 1/102
USPC ........................................ 348/115
See application file for complete search history.

(56) References Cited

U.S. PATENT DOCUMENTS

| 4,179,693 | A  | * | 12/1979 | Evans ...................... G01S 7/04 |
| | | | | 342/64 |
| 9,817,396 | B1 | * | 11/2017 | Takayama ............ G05D 1/0038 |
| 9,830,713 | B1 | * | 11/2017 | Walker ................... H04N 5/247 |
| 9,927,809 | B1 | * | 3/2018 | Tofte ..................... G05D 1/0038 |
| 2002/0103617 | A1 | * | 8/2002 | Uchiyama ................ G06T 7/74 |
| | | | | 702/150 |
| 2013/0038692 | A1 | | 2/2013 | Ohtomo et al. |
| 2013/0173088 | A1 | | 7/2013 | Callou et al. |
| 2013/0176192 | A1 | * | 7/2013 | Varga ...................... G09G 3/04 |
| | | | | 345/7 |
| 2016/0191793 | A1 | * | 6/2016 | Yang ................. H04N 5/23222 |
| | | | | 348/207.11 |
| 2016/0241767 | A1 | * | 8/2016 | Cho .................... H04N 5/23203 |
| 2016/0297545 | A1 | * | 10/2016 | Yang ....................... G08C 17/02 |
| 2017/0026680 | A1 | | 1/2017 | Sugio et al. |
| 2017/0178352 | A1 | * | 6/2017 | Harmsen ................ G06T 7/579 |
| 2018/0158197 | A1 | * | 6/2018 | Dasgupta ............. G05D 1/0094 |

FOREIGN PATENT DOCUMENTS

| JP | 2013-038622 A | 2/2013 |
| JP | 2013-144539 A | 7/2013 |
| JP | 2016-010145 A | 1/2016 |

* cited by examiner

*Primary Examiner* — Michael Lee
(74) *Attorney, Agent, or Firm* — Oliff PLC

(57) ABSTRACT

An HMD includes an image display section worn on a head of a user, an HMD communication section configured to receive a captured image transmitted by a vehicle, a position estimating section configured to estimate a position of the vehicle in a real space on the basis of the captured image received by the HMD communication section, and a display control section configured to cause the image display section to display the captured image received by the HMD communication section and information concerning the position of the vehicle estimated by the position estimating section.

12 Claims, 12 Drawing Sheets

DISPLAY DEVICE AND CONTROL METHOD FOR DISPLAY DEVICE

BACKGROUND

1. Technical Field

The present invention relates to a display device and a control method for the display device.

2. Related Art

There has been known an unmanned aircraft (a so-called Drone) that can be remotely piloted (see, for example, JP-A-2013-144539 (Patent Literature 1)). The unmanned aircraft described in Patent Literature 1 is a quadricopter including a navigation posture control system. The unmanned aircraft receives a piloting command through a wireless link between the unmanned aircraft and a remote control device. The unmanned aircraft includes a camera and transmits an image captured by the camera to the remote control device. A user of the unmanned aircraft can perform operation such as a turn and an ascent or a descent of the unmanned aircraft and a change of a direction indicated by the camera using a touch screen of the remote control device.

As described in Patent Literature 1, when the camera is provided in the unmanned aircraft to cause the camera to perform imaging, if the position and the direction of the unmanned aircraft during the imaging can be known, improvement of usefulness of a captured image can be expected. For example, in the configuration described in Patent Literature 1, it is possible to calculate a relative angle and a relative direction between the remote control device and the unmanned aircraft. However, even if association between the position of the unmanned aircraft during the imaging and the captured image can be known after the imaging, usability of the captured image is limited.

SUMMARY

An advantage of some aspects of the invention is to make it possible to, concerning a captured image captured by a vehicle including a camera, effectively perform association of the captured image and the position of the vehicle during imaging.

An aspect of the invention is directed to a display device including: a display section worn on a head of a user; a communication section configured to receive a captured image transmitted by a vehicle; a position estimating section configured to estimate a position of the vehicle in a real space on the basis of the captured image received by the communication section; and a display control section configured to cause the display section to display the captured image received by the communication section and information concerning the position of the vehicle estimated by the position estimating section.

According to the aspect of the invention, it is possible to display the captured image captured by the vehicle together with the position of the vehicle. Consequently, the user can easily grasp correspondence between the position of the vehicle and the captured image. Therefore, for example, it is possible to perform the imaging after confirming the position of the vehicle. Improvement of usefulness of the captured image can be expected.

In the configuration described above, the position estimating section may specify, on the basis of a reference captured image of a predetermined range imaged by the vehicle, a position of the vehicle at a time when the reference captured image is captured and set a reference vehicle position, and estimate the position of the vehicle on the basis of the reference vehicle position.

According to this configuration, it is possible to easily estimate the position of the vehicle with, for example, a method of using a movement amount and a moving direction of the vehicle from the reference vehicle position.

In the configuration described above, the communication section may receive position information transmitted by the vehicle, and the position estimating section may estimate the position of the vehicle by calculating a movement amount of the vehicle from the reference vehicle position on the basis of the position information received by the communication section.

According to the aspect, it is possible to easily and accurately estimate the position of the vehicle.

In the display device according to the aspect, when the captured image is received by the communication section, the position estimating section may estimate the position of the vehicle on the basis of the received captured image and the reference captured image.

According to this configuration, it is possible to easily estimate the position of the vehicle by using the captured image transmitted by the vehicle.

In the configuration described above, the display control section may display at least any one of an imaging direction of the vehicle, an imaging magnification, an altitude of the vehicle, and a movement amount from the reference vehicle position as information concerning the position of the vehicle.

According to this configuration, it is possible to display the imaging direction of the vehicle, the imaging magnification, the altitude of the vehicle, the movement amount from the reference vehicle position, and the like and appropriately provide information to the user of the display device.

In the configuration described above, the display device may further include a position designating section configured to designate a position in the captured image received by the communication section, and the position estimating section may estimate, on the basis of the position of the vehicle at a time when the captured image is captured, a position in the real space corresponding to the position designated by the position designating section.

According to this configuration, it is possible to provide information concerning correspondence between the captured image and the real space to the user by estimating the position in the real space corresponding to the position in the captured image.

In the configuration described above, the position estimating section may set, as a marker position, the estimated position in the real space corresponding to the position designated by the position designating section, and the display control section may cause the display section to display the marker position.

According to this configuration, it is possible to provide, with the display section, the information concerning the correspondence between the captured image and the real space to the user.

In the configuration described above, when the captured image is received by the communication section, the position estimating section may estimate a relative position of the marker position in the received captured image, and the display control section may cause, on the basis of the relative position estimated by the position estimating section, the display section to display the captured image received by the communication section and a display object indicating the marker position.

According to this configuration, it is possible to provide the information concerning the correspondence between the captured image and the real space to the user by displaying the display object indicating the designated position together with the captured image.

In the configuration described above, the display device may further include a receiving section configured to receive operation, and the display device may transmit, with the communication section, control information for controlling the vehicle on the basis of the operation received by the receiving section.

According to this configuration, it is possible to reflect operation on the display device to the control of the vehicle. It is possible to achieve improvement of operability of the vehicle.

In the configuration described above, the display device may further include a movement sensor configured to detect a movement of the display section, and the receiving section may receive operation by the movement of the display device on the basis of a detection value of the movement sensor.

According to this configuration, it is possible to reflect the operation by the movement of the display section on the control of the vehicle. It is possible to achieve the improvement of the operability of the vehicle.

Another aspect of the invention is directed to a control method for a display device including a display section worn on a head of a user, the control method including: receiving a captured image transmitted by a vehicle; estimating a position of the vehicle in a real space on the basis of the received captured image; and displaying, on the display section, the captured image received from the vehicle and information concerning the estimated position of the vehicle.

According to the aspect of the invention, it is possible to display the captured image captured by the vehicle together with the position of the vehicle. Consequently, the user can easily grasp correspondence between the position of the vehicle and the captured image. Therefore, for example, it is possible to perform the imaging after confirming the position of the vehicle. Improvement of usefulness of the captured image can be expected.

The invention can also be realized in various forms other than the display device and the control method for the display device explained above. For example, it is also possible to configure a display system including the display device. Specifically, the invention may be a system including the display device and the vehicle. The invention may be realized as a computer program executed by the control section or a computer in order to execute the control method. The invention can be realized in forms such as a recording medium having the computer program recorded therein, a server apparatus that distributes the computer program, a transmission medium that transmits the computer program, and a data signal obtained by embodying the computer programs in a carrier wave.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
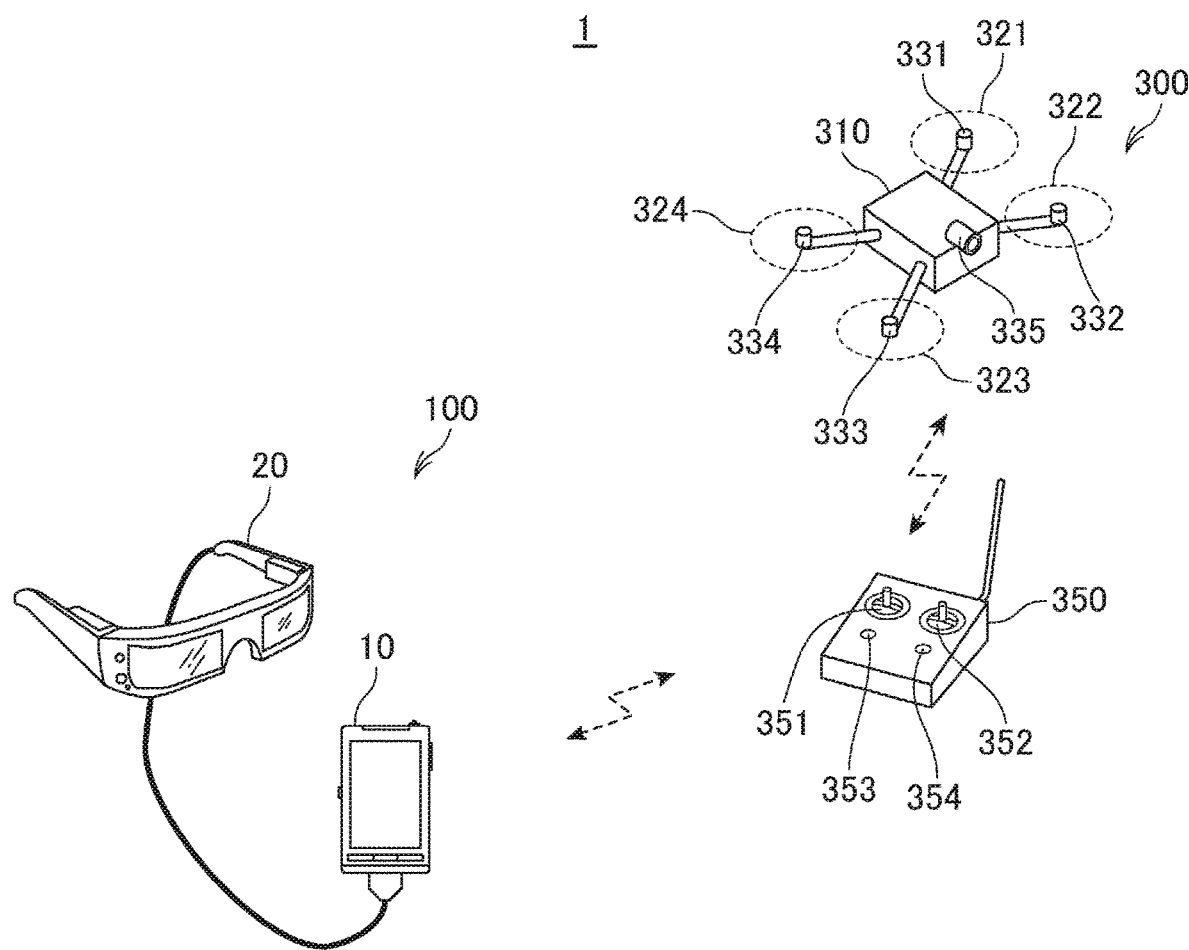
FIG. 1 is a schematic configuration diagram of a mobile machine control system.

FIG. 1 is a schematic configuration diagram of a mobile machine control system 1 according to an embodiment applied with the invention. The mobile machine control system 1 includes a mobile machine unit 300 and an HMD (Head Mounted Display: a head-mounted display device) 100 worn and used by an operator who pilots the mobile machine unit 300. The operator can be called user. In the following explanation, the operator is referred to as user.

The mobile machine unit 300 includes a mobile machine 310 (a vehicle) and a remote controller 350 used for piloting of the mobile machine 310.

In this embodiment, the mobile machine 310 is illustrated as a form of the vehicle according to the invention. The mobile machine 310 is an aerial vehicle that flies according to rotation of four propellers 321, 322, 323, and 324. Alternatively, the mobile machine 310 is a type of a so-called Drone that means an unmanned aerial vehicle (UAV) and can also be called quadricopter. The mobile machine 310 is remotely piloted by the remote controller 350.

The propellers 321, 322, 323, and 324 are respectively driven by flight motors 331, 332, 333, and 334 to rotate and lift the mobile machine 310. A mobile machine camera 335 is provided in the mobile machine 310. The mobile machine 310 can transmit a captured image captured by the mobile machine camera 335 to the remote controller 350. The mobile machine camera 335 may be directly fixed to a main body of the mobile machine 310 or may be fixed to the main body of the mobile machine 310 via a pedestal such as a Gimbal or a platform. A mechanism for changing and adjusting an imaging direction of the mobile machine camera 335 may be provided in the pedestal of the mobile machine camera 335.

The remote controller 350 includes various operators operated by the user. The remote controller 350 executes wireless communication between the remote controller 350 and the mobile machine 310, generates command corresponding to the operation of the operators, and transmits the commands to the mobile machine 310. The mobile machine 310 receives the commands transmitted from the remote controller 350 and flies according to the commands. A specific configuration such as the number and the shape of the operators included in the remote controller 350 is optional. In this embodiment, as an example, operation sticks 351 and 352 and operation buttons 353 and 354 are shown in the figure. The operation sticks 351 and 352 are respectively bar-like operators operable to be tilted in the front-rear direction and/or the left-right direction with respect to a main body of the controller 350. The operation buttons 353 and 354 are configured by, for example, push-button switches or touch sensors of a touch detection type.

The HMD 100 is a display device including an image display section 20 (a display section) that causes the user to visually recognize a virtual image in a state in which the HMD 100 is mounted on the head of the user and a control device 10 that controls the image display section 20. As explained below with reference to FIG. 3, the control device 10 includes a main body having a flat box shape. The control device 10 includes, in the main body, operation sections such as various switches and an operation pad that receive operation by the user. The user operates the operation sections, whereby the control device 10 functions as a control device that controls the HMD 100.

The HMD 100 executes communication between the HMD 100 and the remote controller 350. The remote controller 350 is capable of transmitting, to the HMD 100, image data based on captured image data wirelessly transmitted by the mobile machine 310. The HMD 100 receives the image data from the remote controller 350 and displays, with the image display section 20, an image based on the received image data. Consequently, the user can visually recognize, with the image display section 20, a captured image captured by the mobile machine 310, operate the remote controller 350, and pilot the mobile machine 310.

A form for connecting the HMD 100 and the remote controller 350 is optional. For example, the control device 10 and the remote controller 350 may be connected by wire. More specifically, a form is conceivable in which the HMD 100 and the remote controller 350 are connected by a USB (Universal Serial bus)® cable or the like. In this embodiment, an example is explained in which the HMD 100 and the remote controller 350 are connected to each other to be capable of performing data communication by a wireless communication line.

Figure 2:
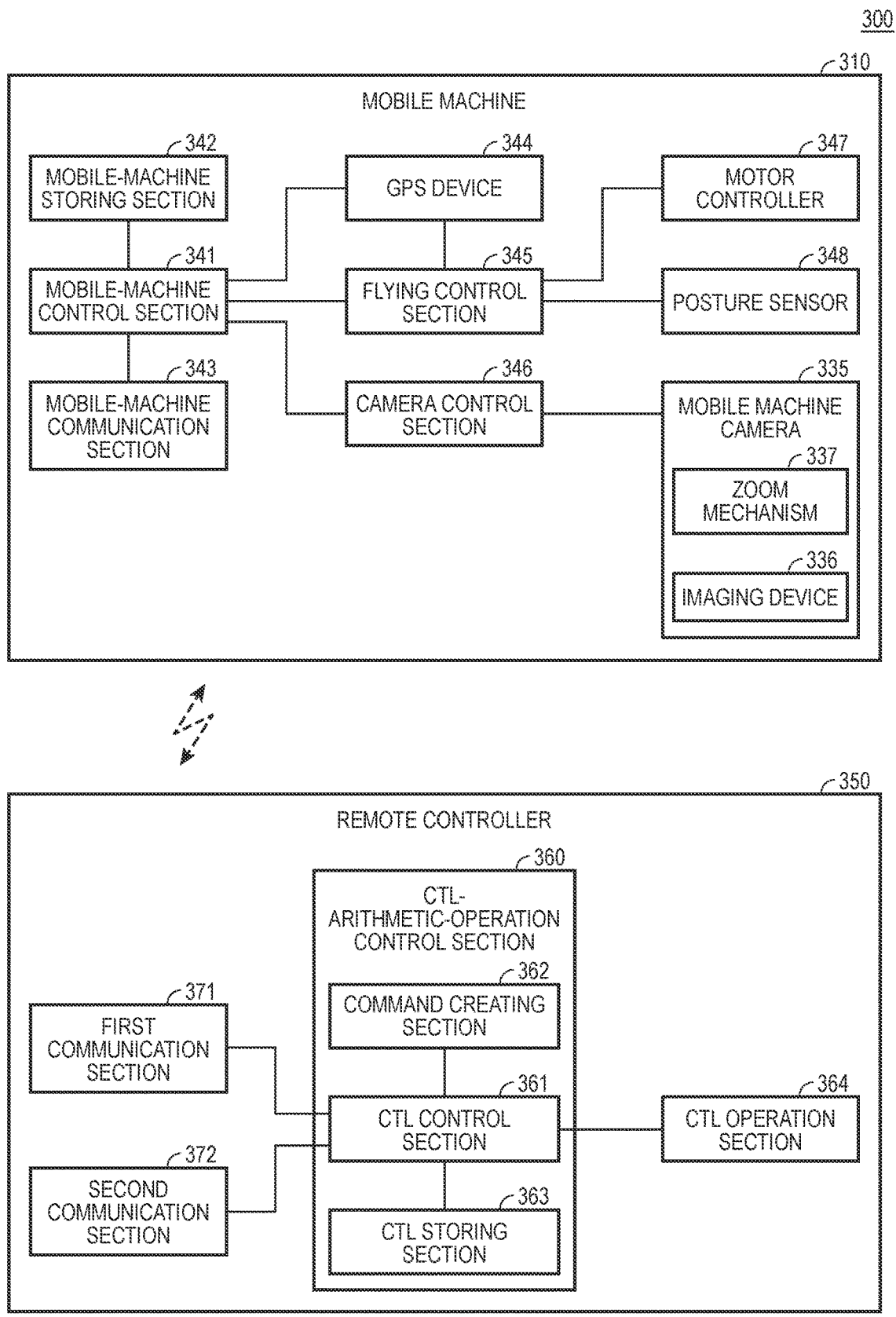
FIG. 2 is a functional block diagram of a mobile machine unit.

FIG. 2 is functional block diagram of the mobile machine unit 300. The configuration of a control system of the mobile machine 310 and the configuration of a control system of the remote controller 350 are shown.

The control system of the mobile machine 310 is configured by a mobile-machine control section 341 that controls the mobile machine 310 and sections connected to the mobile-machine control section 341. Specifically, the mobile machine 310 includes the mobile-machine control section 341, a mobile-machine storing section 342, a mobile-machine communication section 343, a GPS device 344, a flight control section 345, a camera control section 346, a motor controller 347, and a posture sensor 348. Although not shown in the figure, the mobile machine 310 includes a battery that supplies electric power to sections including the flight motors 331, 332, 333, and 334 (FIG. 1) and a battery control circuit that controls the power supply by the battery.

The mobile-machine control section 341 includes an arithmetic processing device (a processor) such as a CPU (Central Processing Unit) or a microcomputer. The mobile-machine control section 341 controls the mobile machine 310 by executing a computer program. The mobile-machine control section 341 may include a ROM (Read Only Memory), a RAM (Random Access Memory), and other peripheral circuits.

The mobile-machine storing section 342 that stores data and the like processed by the mobile-machine control section 341 is connected to the mobile-machine control section 341. The mobile-machine storing section 342 includes a storage device such as a semiconductor memory element and stores various data concerning the control of the mobile machine 310 and computer programs executed by the mobile-machine control section 341.

The mobile-machine communication section 343 is connected to the mobile-machine control section 341. The mobile-machine communication section 343 includes an antenna, an RF circuit, a baseband circuit, and a communication control circuit. Alternatively, the mobile-machine communication section 343 is configured by a device obtained by integrating the antenna, the RF circuit, the baseband circuit, and the communication control circuit. The mobile-machine communication section 343 executes wireless communication between the mobile-machine communication section 343 and the remote controller 350. The mobile-machine communication section 343 executes the wireless communication in a 27 MHz band, a 40 MHz band, a 2.4 GHz band, and the like, which are frequencies for radio control. Alternatively, the mobile-machine communication section 343 performs wireless communication conforming to standards such as a Bluetooth® and a wireless LAN (including Wi-Fi®). The mobile-machine communication section 343 executes communication with the remote controller 350 according to the control by the mobile-machine control section 341, receives a command transmitted by the remote controller 350, and outputs the command to the mobile-machine control section 341. The mobile-machine communication section 343 transmits captured image data of the mobile machine camera 335 to the remote controller 350.

The GPS (Global Positioning System) device 344 is a device that measures (positions) the position of the mobile machine 310. The GPS device 344 performs the positioning according to the control by the mobile-machine control section 341 and outputs a positioning result to the mobile-machine control section 341. The positioning result output by the GPS device 344 includes the latitude and the longitude of the mobile machine 310 and may include the altitude of the mobile machine 310.

The flight control section 345 is connected to the mobile-machine control section 341. The flight control section 345 is connected to the motor controller 347 and the posture sensor 348. The motor controller 347 is a circuit that drives the flight motors 331, 332, 333, and 334 according to the control by the flight control section 345.

The posture sensor 348 is a sensor that detects the posture and the movement of the mobile machine 310. For example, the posture sensor 348 can include any one of a gyro sensor, an acceleration sensor, a speed sensor, and an altitude sensor. The posture sensor 348 may include a terrestrial magnetism sensor for detecting the direction of the mobile machine 310. For example, as the posture sensor 348, a nine-axis motion sensor unit obtained by integrating a three-axis gyro sensor, a three-axis acceleration sensor, and a three-axis terrestrial magnetism sensor may be used. The altitude sensor may be integrated in the motion sensor unit. The posture sensor 348 outputs a detection value to the flight control section 345 according to the control by the flight control section 345.

The flight control section 345 controls the flight of the mobile machine 310 according to the control by the mobile-machine control section 341. The flight control section 345 acquires a detection value of the posture sensor 348 and controls the motor controller 347 according to a preset flight program using the detection value of the posture sensor 348. An autonomous flight program executed by the flight control section 345 is a computer program for realizing control for retaining the posture of the mobile machine 310 in a predetermined flight posture, control for ascending or descending to an altitude designated by the mobile-machine control section 341, control for flying to a position designated by the mobile-machine control section 341, and the like. The autonomous flight program executed by the flight control section 345 is capable of executing a preset routine operation.

The routine operation indicates flight operations having decided contents such as hovering, fixed route flight, and fixed position flight. The hovering is operation for flying while maintaining a fixed position. The fixed route flight is operation for moving while adjusting altitude, latitude, and longitude along a preset route. The fixed position flight is operation for moving while adjusting altitude, latitude, and longitude toward a preset position. In the routine operation, the flight control section 345 autonomously executes detailed control such as control of the numbers of revolutions of the flight motors 331, 332, 333, and 334. For example, the user operating the remote controller 350 only has to designate a type of the routine operation, a destination, and the like. It is possible to realize simplification of operation.

The position of the mobile machine 310 includes altitude, latitude, and longitude. For example, when the mobile-machine control section 341 receives a command for designating a type of the routine operation from the remote controller 350, the mobile-machine control section 341 instructs the flight control section 345 to execute the routine operation. The flight control section 345 performs the routine operation of the designated type according to the instruction of the mobile-machine control section 341.

The autonomous flight program for performing the routine operation and various data such as a route and a position of the routine operation are stored in, for example, the mobile-machine storing section 342. Consequently, it is possible to cause the mobile machine 310 to perform the routine operation by performing simple operation for instructing the routine operation in the remote controller 350. It is also possible to integrate the flight control section 345 in the mobile machine 310. For example, an arithmetic processing device configuring the mobile machine 310 may execute a computer program to thereby function as the flight control section 345. The mobile-machine control section 341 and the flight control section 345 may be configured by hardware programmed to execute the same function as the function of the computer program.

The flight control section 345 outputs a detection value detected by the mobile machine 310 with the posture sensor 348 and/or latitude and longitude detected by the mobile machine 310 with the GPS device 344 to the mobile-machine control section 341. The mobile-machine control section 341 can transmit, with the mobile-machine communication section 343, a part or all of the detection value of the posture sensor 348 and the detection result of the GPS device 344 to the remote controller 350. Information concerning the position of the mobile machine 310 transmitted by the mobile machine 310 to the remote controller 350 is referred to as mobile machine position information. The mobile machine position information includes, for example, the altitude, the latitude, and the longitude of the mobile machine 310. The mobile machine position information may include information other than the altitude, the latitude, and the longitude as information indicating the position of the mobile machine 310. For example, the position of the mobile machine 310 may be represented by an address indication, a place name, or a lot number corresponding to a plane position of the mobile machine 310 or a facility name or a building name in the vicinity of or immediately below the mobile machine 310. The mobile machine position information may include information indicating the position of the mobile machine 310 with a direction and a distance based on a preset landmark.

The information concerning the position of the mobile machine 310 transmitted to the remote controller 350 by the mobile machine 310 may include, besides the mobile machine position information, mobile machine state information concerning an environment and a state of the mobile machine 310. The mobile machine state information may include information related to the position of the mobile machine 310. For example, the mobile machine state information may include information concerning a peripheral facility such as a facility name or a building name in the vicinity of or immediately below the mobile machine 310. The mobile machine state information may include information concerning the environment (weather, temperature, humidity, wind velocity, wind direction, precipitation, etc.) of the mobile machine 310.

The mobile machine 310 may transmit mobile machine position information based on a detection value and/or a detection result acquired at timing designated by the remote controller 350 to the remote controller 350. The mobile machine 310 may transmit, at any time, mobile machine position information based on a detection value and/or a detection result acquired after the timing designated by the remote controller 350 to the remote controller 350.

Note that a component with which the mobile machine 310 detects a position is not limited to the GPS device 344 and the posture sensor 348. For example, the mobile machine 310 may receive a beacon signal from a wireless beacon transmitter set in advance in an area where the mobile machine 310 flies and detect the position of the mobile machine 310 on the basis of reception intensity and the like of the beacon signal. As the wireless beacon transmitter, an optical beacon device that transmits a beacon signal with light outside a visible region such as infrared light (IR) or a Bluetooth beacon that transmits a beacon signal with the Bluetooth can be used. The position of the mobile machine 310 detected in this case includes an altitude and a relative position with respect to the wireless beacon transmitter. In this case, the mobile-machine control section 341 only has to generate mobile machine position information including the altitude and the relative position with respect to the wireless beacon transmitter and transmit the mobile machine position information to the remote controller 350.

The camera control section 346 that controls the flight control section 345 is connected to the mobile-machine control section 341. The flight control section 345 is set in the main body of the mobile machine 310 as explained above and images a predetermined direction. The flight control section 345 includes an imaging device 336 and a zoom mechanism 337 that moves an imaging lens (not shown in the figure) to adjust a zoom magnification. The imaging device 336 includes, for example, a CCD (Charge Coupled Device) image sensor or a CMOS (Complementary Metal Oxide Semiconductor) image sensor.

The camera control section 346 drives the imaging device 336 and the zoom mechanism 337 according to the control by the mobile-machine control section 341, performs imaging at a zoom magnification designated by the mobile-machine control section 341, and outputs captured image data to the mobile-machine control section 341. The mobile machine 310 executes imaging with the mobile machine camera 335 at a preset sampling cycle and generates captured image data. That is, the mobile machine 310 is considered to capture a moving image. The mobile machine 310 can transmit captured image data captured at timing designated by the remote controller 350 to the remote controller 350. In this case, the remote controller 350 can acquire captured image data of a still image captured by the mobile machine 310. The mobile machine 310 can transmit, at any time, captured image data captured after the timing designated by the remote controller 350 to the remote controller 350. In this case, the remote controller 350 can acquire captured image data of a moving image (a video) captured by the mobile machine 310.

The remote controller 350 includes a CTL (Controller)-arithmetic control section 360. The CTL-arithmetic control section 360 includes a CTL control section 361, a command creating section 362, and a CTL storing section 363. The CTL-arithmetic control section 360 includes an arithmetic processing device such as a CPU or a microcomputer, a ROM, a RAM, and a nonvolatile storage element. The CTL-arithmetic control section 360 executes computer programs with the arithmetic processing device to thereby control the remote controller 350. The CTL control section 361 and the command creating section 362 of the CTL-arithmetic control section 360 may be realized by the arithmetic processing device executing computer programs. The CTL-arithmetic control section 360 may be configured by hardware programmed to execute the same functions as the functions of the computer programs explained above. The CTL storing section 363 is configured using a part or all of storage regions of the ROM, the RAM, and the nonvolatile storage element. The CTL storing section 363 stores computer programs executed by the CTL-arithmetic control section 360 and various data processed by the CTL-arithmetic control section 360.

A CTL operation section 364 is connected to the CTL-arithmetic control section 360. The CTL operation section 364 includes the operation sticks 351 and 352 and the operation buttons 353 and 354 shown in FIG. 1 and other operators.

A first communication section 371 and a second communication section 372 are connected to the CTL-arithmetic control section 360. The first communication section 371 is a communication section that performs wireless communication with the mobile-machine communication section 343 included in the mobile machine 310. A frequency band and a communication scheme used for communication by the first communication section 371 only have to be selected as appropriate such that the first communication section 371 can communicate with the mobile-machine communication section 343. Therefore, like the mobile-machine communication section 343, the first communication section 371 executes wireless communication in the 27 MHz band, the 40 MHz band, the 2.4 GHz band, and the like that are frequencies of radio control. Alternatively, the mobile-machine communication section 343 performs wireless communication conforming to a standard such as a Bluetooth® or a wireless LAN (including Wi-Fi).

The second communication section 372 is a communication section that executes wireless communication between the second communication section 372 and the HMD 100. The second communication section 372 performs wireless communication conforming to a standard such as a Bluetooth or a wireless LAN (including Wi-Fi).

The CTL-arithmetic control section 360 detects operation by the CTL operation section 364 with the function of the CTL control section 361. When the detected operation is operation for instructing the operation of the mobile machine 310, the CTL control section 361 generates, with the function of the command creating section 362, a command corresponding to the operation of the CTL operation section 364. The CTL control section 361 transmits, with the first communication section 371, the command generated by the command creating section 362 and causes the mobile machine 310 to fly. The command generated by the command creating section 362 may be a command for instructing a basic operation such as an ascent, a descent, a turn, or a reverse turn of the mobile machine 310 or may be a command for instructing the routine operation of the mobile machine 310.

The CTL-arithmetic control section 360 communicates with the mobile machine 310 through the first communication section 371 and receives mobile machine position information transmitted by the mobile machine 310. The CTL-arithmetic control section 360 receives captured image data transmitted by the mobile machine 310. The CTL-arithmetic control section 360 can transmit, with the second communication section 372, the mobile machine position information and the captured image data received by the first communication section 371 to the HMD 100. In this case, the CTL-arithmetic control section 360 can transmit the mobile machine position information and/or the captured image data to the HMD 100 at timing designated by the HMD 100. The CTL-arithmetic control section 360 can transmit, at any time, the mobile machine position information and/or the captured image data to the HMD 100 after the timing designated by the HMD 100. The CTL-arithmetic control section 360 may process the mobile machine position information received from the mobile machine 310 and transmit data indicating the position of the mobile machine 310 generated on the basis of the received mobile machine position information to the HMD 100 as new mobile machine position information. The CTL-arithmetic control section 360 may process the captured image data received from the mobile machine 310 and transmit image data generated on the basis of the received captured image data to the HMD 100.

Figure 3:
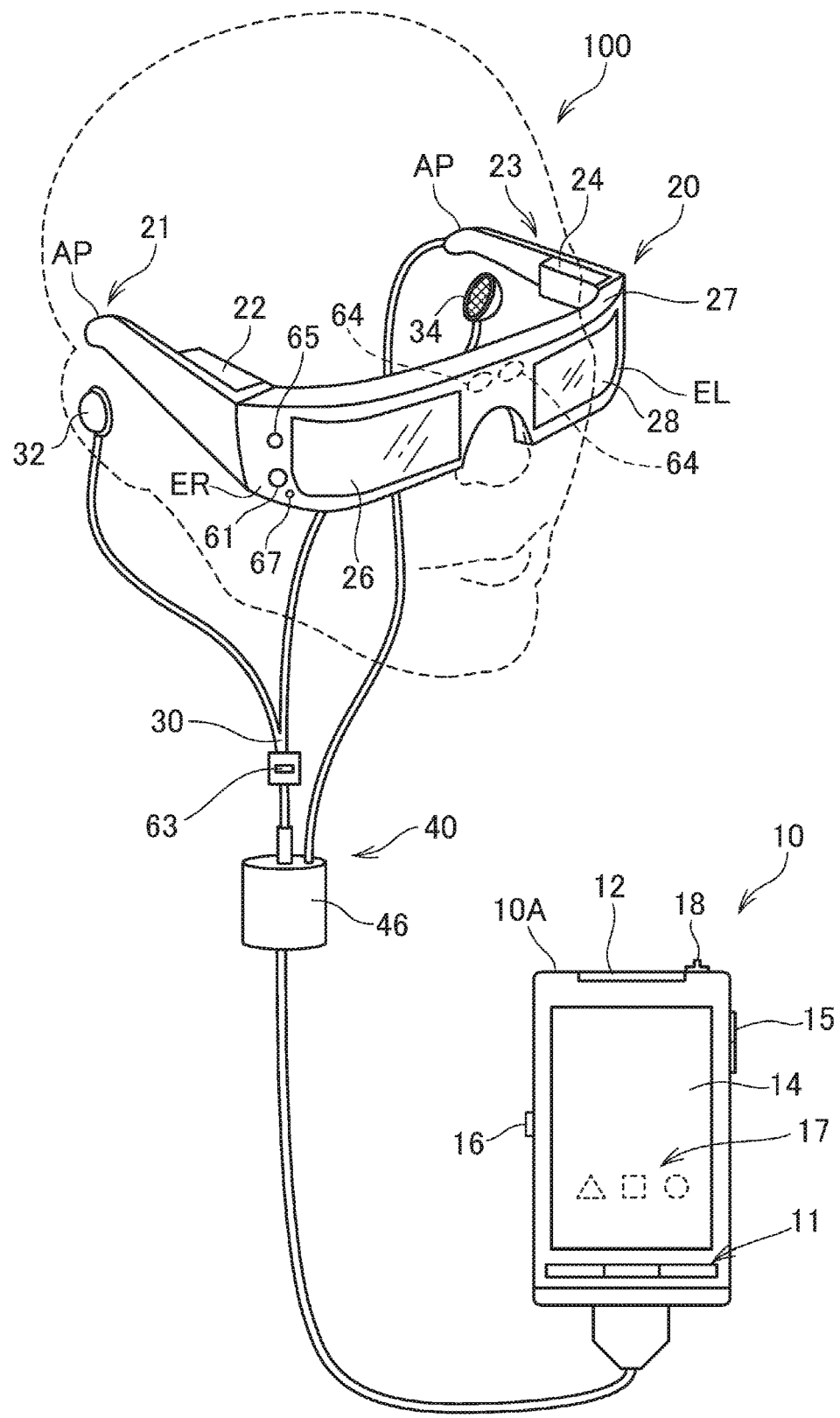
FIG. 3 is an explanatory diagram showing an exterior configuration of an HMD.

FIG. 3 is an explanatory diagram showing an exterior configuration of the HMD 100.

As shown in FIG. 3, the control device 10 includes a case 10A (a housing) having a flat box shape. The case 10A includes various switches, a track pad 14, and the like that receive operation by the user. The user operates the switches, the track pad 14, and the like, whereby the control device 10 functions as a control device that controls the HMD 100. The case 10A incorporates a functional section that controls the HMD 100.

The image display section 20 is a wearing body worn on the head of the user. In this embodiment, the image display section 20 has an eyeglass shape. The image display section 20 includes a right display unit 22, a left display unit 24, a right light guide plate 26, and a left light guide plate 28 in a main body including a right holding section 21, a left holding section 23, and a front frame 27.

The right holding section 21 and the left holding section 23 respectively extend backward from both end portions of the front frame 27 and, like temples of eyeglasses, hold the image display section 20 on the head of the user. Of both the end portions of the front frame 27, the end portion located on the right side of the user in a worn state of the image display section 20 is represented as an end portion ER and the end portion located on the left side of the user is represented as an end portion EL. The right holding section 21 is provided to extend from the end portion ER of the front frame 27 to a position corresponding to the right temporal region of the user in the worn state of the image display section 20. The left holding section 23 is provided to extend from the end portion EL to a position corresponding to the left temporal region of the user in the worn state of the image display section 20.

The right light guide plate 26 and the left light guide plate 28 are provided in the front frame 27. The right light guide plate 26 is located in front of the right eye of the user in the worn state of the image display section 20 and causes the right eye to visually recognize an image. The left light guide plate 28 is located in front of the left eye of the user in the worn state of the image display section 20 and causes the left eye to visually recognize the image.

The front frame 27 has a shape obtained by coupling one end of the right light guide plate 26 and one end of the left light guide plate 28 to each other. A position of the coupling corresponds to the middle of the forehead of the user in the worn state in which the user wears the image display section 20. In the front frame 27, a nose pad section in contact with the nose of the user in the worn state of the image display section 20 may be provided in the coupling position of the right light guide plate 26 and the left light guide plate 28. In this case, the image display section 20 can be held on the head of the user by the nose pad section and the right holding section 21 and the left holding section 23. A belt (not shown in the figure) in contact with the back of the head of the user in the worn state of the image display section 20 may be coupled to the right holding section 21 and the left holding section 23. In this case, the image display section 20 can be held on the head of the user by the belt.

The right display unit 22 is a unit related to display of an image by the right light guide plate 26. The right display unit 22 is provided in the right holding section 21 and located in the vicinity of the right temporal region of the user in the worn state. The left display unit 24 is a unit related to display of an image by the left light guide plate 28. The left display unit 24 is provided in the left holding section 23 and located in the vicinity of the left temporal region of the user in the worn state. Note that the right display unit 22 and the left display unit 24 are collectively simply referred to as "display driving section" as well.

The right light guide plate 26 and the left light guide plate 28 in this embodiment are optical sections formed of light transmissive resin or the like and are, for example, prisms. The right light guide plate 26 and the left light guide plate 28 guide image lights emitted by the right display unit 22 and the left display unit 24 to the eyes of the user.

An electronic shade (not shown in the figure) having a dimming function may be provided on the surfaces of the right light guide plate 26 and the left light guide plate 28. The electronic shade includes terminals (not shown in the figure) to which a voltage is input and a shade main body (not shown in the figure), transmittance of light of which changes according to the voltage between the terminals. The electronic shade is capable of adjusting the applied voltage according to control by an HMD control section 141 explained below. The electronic shade may have a configuration in which the transmittance of an entire wavelength band including visible light changes or may have a configuration having different transmittance depending on a wavelength band of light. For example, the electronic shade is disposed to cover the front side of the front frame 27, which is the opposite side of the side of the eyes of the user. By adjusting an optical characteristic of the electronic shade, it is possible to adjust a light amount of external light made incident on the right light guide plate 26 and the left light guide plate 28 from the outside and transmitted through the right light guide plate 26 and the left light guide plate 28.

The image display section 20 guides image lights respectively generated by the right display unit 22 and the left display unit 24 to the right light guide plate 26 and the left light guide plate 28 and displays an image by causing the user to visually recognize a virtual image with the image light. When the external light is transmitted through the right light guide plate 26 and the left light guide plate 28 and made incident on the eyes of the user from the front of the user, the image lights forming the virtual image and the external light are made incident on the eyes of the user. Visibility of the virtual image is affected by the intensity of the external light. Therefore, it is possible to adjust easiness of the visual recognition of the virtual image by, for example, attaching the electronic shade to the front frame 27 and selecting or adjusting the optical characteristic of the electronic shade as appropriate.

An HMD camera 61 is disposed in the front frame 27 of the image display section 20. The HMD camera 61 desirably images an outside scene direction visually recognized by the user in the state in which the image display section 20 is worn. The HMD camera 61 is provided in a position not blocking the external light transmitted through the right light guide plate 26 and the left light guide plate 28 on the front surface of the front frame 27. In an example shown in FIG. 3, the HMD camera 61 is disposed on the end portion ER side of the front frame 27. The HMD camera 61 may be disposed on the end portion EL side or may be disposed in the coupling portion of the right light guide plate 26 and the left light guide plate 28.

The HMD camera 61 is a digital camera including an imaging device such as a CCD or a CMOS and an imaging lens. Although the HMD camera 61 in this embodiment is a monocular camera, the HMD camera 61 may be configured by a stereo camera. The HMD camera 61 images at least a part of an outside scene (a real space) in the front side direction of the HMD 100, in other words, a visual field direction of the user in the state in which the HMD 100 is mounted. In other words, the HMD camera 61 images a range or a direction overlapping the visual field of the user and images a direction gazed by the user. The breadth of an angle of view of the HMD camera 61 can be set as appropriate. However, in this embodiment, as explained below, the angle of view includes an outside world visually recognized by the user through the right light guide plate 26 and the left light guide plate 28. More desirably, an imaging range of the HMD camera 61 is set such that the entire visual field of the user visually recognizable through the right light guide plate 26 and the left light guide plate 28 can be imaged.

The HMD camera 61 executes imaging according to control by an imaging control section 156 included in the HMD control section 141 and outputs captured image data to the imaging control section 156.

The HMD 100 includes distance sensors 64 that detect a distance to a measurement target object located in a preset measurement direction. For example, the distance sensors 64 can be configured to detect a distance to a measurement target object located in front of the user. In this embodiment, the distance sensors 64 are disposed in the coupling portion of the right light guide plate 26 and the left light guide plate 28 in the front frame 27. In this example, in the worn state of the image display section, the position of the distance sensors 64 is substantially the middle of both the eyes of the user in the horizontal direction and above both the eyes of the user in the vertical direction. The measurement direction of the distance sensors 64 can be set to, for example, the front side direction of the front frame 27. In other words, the measurement direction is a direction overlapping the imaging direction of the HMD camera 61.

The distance sensors 64 include, for example, light sources such as LEDs (Light Emitting Diodes) or laser diodes and light receiving sections that receive reflected light of light emitted by the light sources and reflected on the measurement target object. The distance sensors 64 only have to execute triangulation processing and distance measurement processing based on a time difference according to the control by the HMD control section 141. The distance sensors 64 may be configured to include sound sources that emit ultrasound and detecting sections that receive the ultrasound reflected on the measurement target object. In this case, the distance sensors 64 only have to execute the distance measurement processing on the basis of a time difference until the reflection of the ultrasound according to the control by the HMD control section 141.

The control device 10 and the image display section 20 are connected by a connection cable 40. The connection cable 40 is detachably connected to a connector 42 provided at an end portion of the case 10A. That is, the connector 42, into which the connection cable 40 can be inserted and from which the connection cable 40 can be pulled out, is provided in the case 10A. The connection cable 40 is connected to the connector 42 when the image display section 20 is used.

The connection cable 40 is connected from the distal end of the left holding section 23 to various circuits provided on the inside of the image display section 20. The connection cable 40 includes a metal cable or an optical fiber cable for transmitting digital data and may include a metal cable for transmitting an analog signal. A connector 46 is provided halfway in the connection cable 40.

The connector 46 is a jack (an audio connector) to which a stereo mini plug is connected. The connector 46 and the control device 10 are connected by, for example, a line for transmitting an analog sound signal. In a configuration example shown in FIG. 3, a head set 30 including a right earphone 32 and a left earphone 34 configuring a stereo headphone and a microphone 63 is connected to the connector 46.

Figure 8:
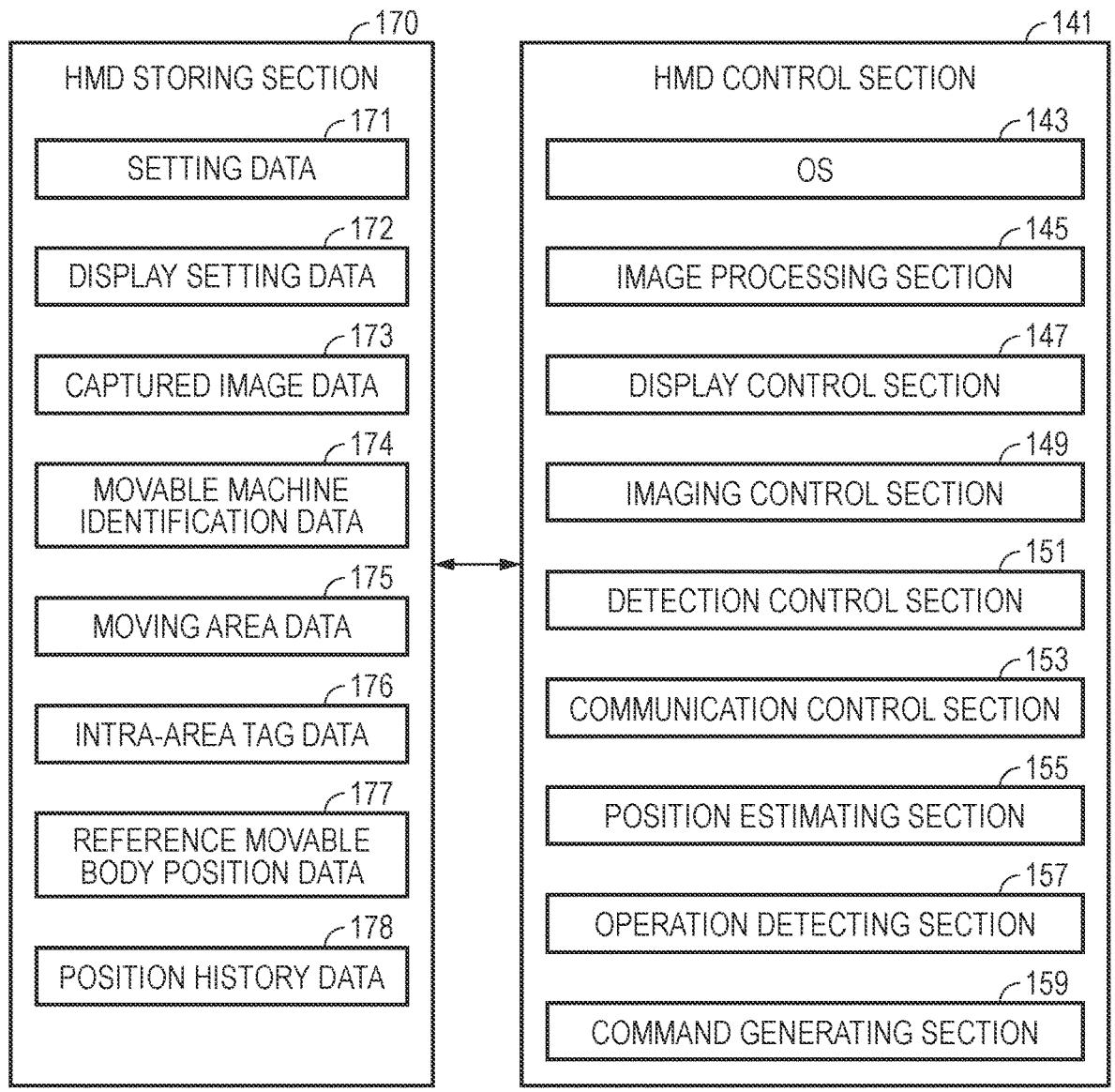
FIG. 8 is a functional block diagram of a control section and a storing section.

For example, as shown in FIG. 3, the microphone 63 is disposed such that a sound collecting section of the microphone 63 is disposed to face a line of sight direction of the user. The microphone 63 collects sound and outputs a sound signal to a sound interface 182 (FIG. 8). For example, the microphone 63 may be a monaural microphone or may be a stereo microphone, may be a microphone having directivity, or may be a nondirectional microphone.

The control device 10 includes the track pad 14, an up-down key 15, an LED display section 17, and a power switch 18 as operated sections operated by the user. These operated sections are disposed on the surface of the case 10A. The operated sections are operated by, for example, the fingers of the user.

The track pad 14 is a region for the user to perform touch operation for bringing a finger into contact with the track pad 14 on the front surface of the case 10A. The track pad 14 may be the same plane as the front surface of the case 10A. However, the track pad 14 is desirably configured to enable the user to identify the track pad 14 and regions other than the track pad 14. For example, a line indicating the edge of the track pad 14 may be formed by printing or unevenness. The track pad 14 may be applied with surface treatment for differentiating a touch of the surface of the track pad 14 from a touch of the regions other than the track pad 14.

The control device 10 can detect, on the front surface of the case 10A, with a touch sensor 13 (FIG. 7) explained below, touch operation on the track pad 14 by the user. When the touch sensor 13 detects the touch operation, the control device 10 specifies a position where the operation is detected. The track pad 14 can be used for operation for inputting an absolute position or a relative position in the track pad 14.

The LED display section 17 is set on the front surface of the case 10A. The LED display section 17 is located in the track pad 14. The surface of the Led display section 17 is not different from other regions on the front surface of the case 10A. The LED display section 17 includes a transmitting section (not shown in the figure) capable of transmitting light. The LED display section 17 emits light such that one or a plurality of LEDs set immediately under the transmitting section are lit, whereby the user can visually recognize signs and the like. In the example shown in FIG. 3, the LEDs of the LED display section 17 are lit, whereby three signs of a triangle, a circle, and a square appear.

The control device 10 can detect, with the touch sensor 13, touch operation of the fingers of the user on the LED display section 17 and specify an operation position. Therefore, for example, the control device 10 can specify which of the signs appearing on the LED display section 17 the operation position corresponds to. Therefore, the LED display section 17 functions as a software button. For example, by associating the signs appearing on the LED display section 17 with the functions of the HMD 100, it is possible to detect touch operation on the LED display section 17 as operation for the functions. In the HMD 100, in the example shown in FIG. 3, the sign of the circle can be allocated to a home button. In this case, when touch operation is performed in the position of the sign of the circle, the HMD control section 141 detects operation of the home button. The sign of the square can be allocated to a history button. In this case, the HMD control section 141 detects touch operation on the sign of the square as operation of the history button. Similarly, the sign of the triangle can be allocated to a return button. The HMD control section 141 detects touch operation on the sign of the triangle as operation of the return button.

The up-down key 15 includes a pair of keys disposed on aside surface of the case 10A to detect pressing operation. The up-down key 15 is used for an instruction input for an increase or a reduction of sound volume output from the right earphone 32 and the left earphone 34 and an instruction input for an increase or a decrease of the brightness of display of the image display section 20.

The power switch 18 is a switch for switching ON/OFF of a power supply of the HMD 100.

In the case 10A, a USB connector 188 (FIG. 7) is provided on a side surface on the same side as the power switch 18. The USB connector 188 is an interface for connecting the control device 10 to an external apparatus. In this embodiment, as an example of the interface, a connector conforming to a USB standard is illustrated. The USB connector 188 is, for example, a connector having a shape and a size matching a micro USB standard. Specifications such as transfer speed are optional.

The control device 10 includes a battery 132 (FIG. 7) as explained below. The control device 10 and the image display section 20 operate with electric power supplied by the battery 132. Charging to the battery 132 can be performed by supplying electric power to the USB connector 188. In the HMD 100, charging can be performed by detaching the control device 10 and the image display section 20 and connecting only the control device 10 to a dedicated charging device.

Figure 4:
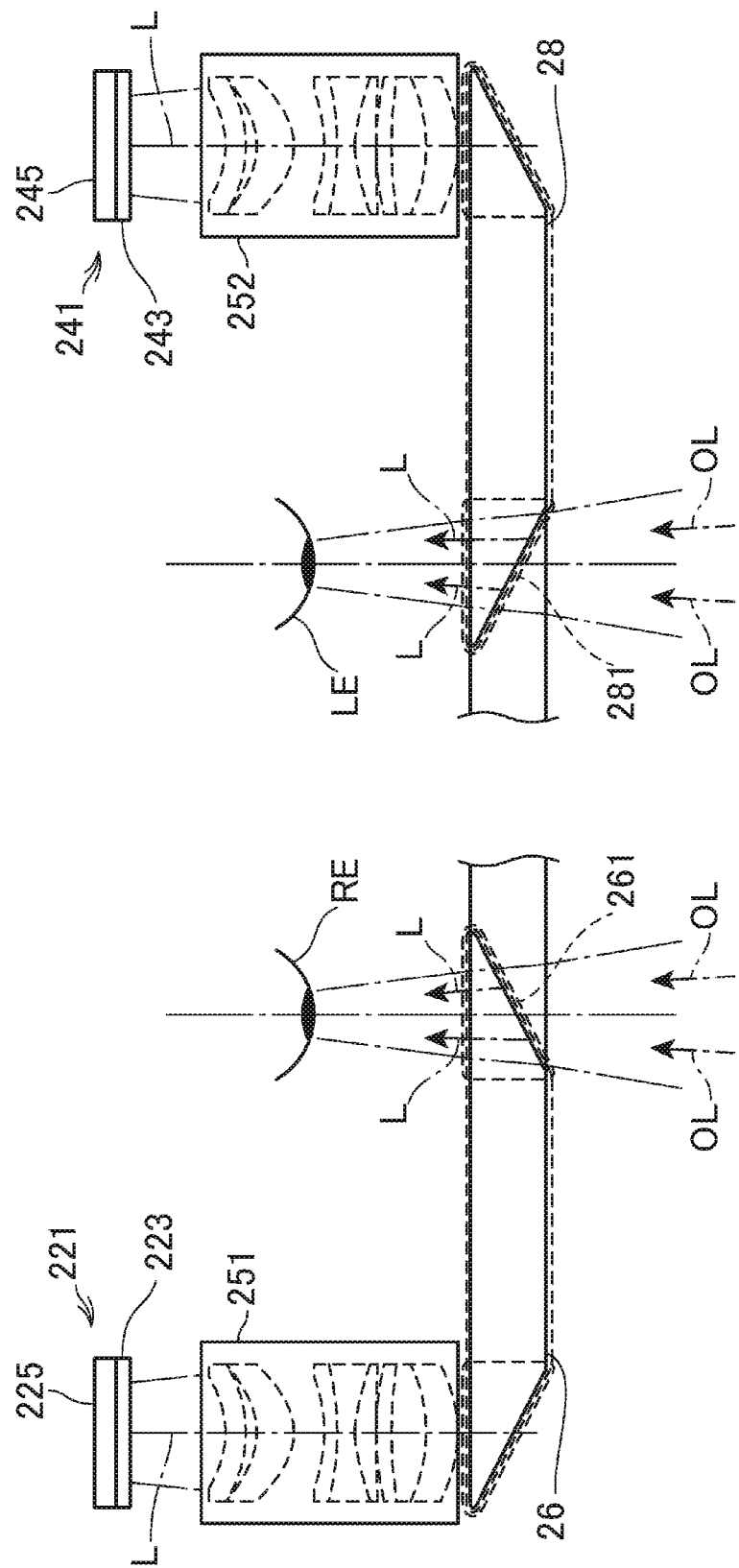
FIG. 4 is a diagram showing the configuration of an optical system of an image display section.

FIG. 4 is a main part plan view showing the configuration of an optical system included in the image display section 20. In FIG. 4, a left eye LE and a right eye RE of the user are shown for explanation.

As shown in FIG. 4, the right display unit 22 and the left display unit 24 are symmetrically configured. As a component for causing the right eye RE of the user to visually recognize an image, the right display unit 22 includes an OLED (Organic Light Emitting Diode) unit 221 that emits image light and a right optical system 251 including a lens group for guiding image light L emitted by the OLED unit 221. The image light L is guided to the right light guide plate 26 by the right optical system 251.

The OLED unit 221 includes an OLED panel 223 and an OLED driving circuit 225 that drives the OLED panel 223. The OLED panel 223 is a self-emitting display panel configured by arranging, in a matrix shape, light emitting elements that emit lights with organic electroluminescence and respectively emit color lights of R (red), G (green), and B (blue). The OLED panel 223 includes a plurality of pixels, one pixel of which is a unit including one each of R, G, and B elements. The OLED panel 223 forms an image with the pixels arranged in the matrix shape. The OLED driving circuit 225 executes selection of a light emitting element included in the OLED panel 223 and energization to the light emitting element and causes the light emitting element of the OLED panel 223 to emit light according to the control by the HMD control section 141. The OLED driving circuit 225 is fixed to the rear side of a rear surface, that is, a light emitting surface of the OLED panel 223 by bonding or the like. The OLED driving circuit 225 may be configured by, for example, a semiconductor device that drives the OLED panel 223 and may be mounted on a substrate (not shown in the figure) fixed to the rear surface of the OLED panel 223. A temperature sensor 217 (FIG. 7) is mounted on the substrate.

Note that the OLED panel 223 may be configured by arranging, in a matrix shape, light emitting elements that emit white light and disposing color filters corresponding to the colors of R, G, and B to be superimposed one on top of another. An OLED panel 223 of a WRGB configuration including a light emitting element that emits W (white) light in addition to the light emitting elements that respectively radiate the color lights of R, G, and B may be used.

The right optical system 251 includes a collimate lens that changes the image light L emitted from the OLED panel 223 to a light beam in a parallel state. The image light L changed to the light beam in the parallel state by the collimate lens is made incident on the right light guide plate 26. A plurality of reflection surfaces that reflect the image light L are formed in an optical path for guiding light on the inside of the right light guide plate 26. The image light L is guided to the right eye RE side through a plurality of times of reflection on the inside of the right light guide plate 26. A half mirror 261 (a reflection surface) located in front of the right eye RE is formed in the right light guide plate 26. The image light L is reflected on the half mirror 261 and emitted from the right light guide plate 26 toward the right eye RE. The image light L forms an image on the retina of the right eye RE and causes the user to visually recognize the image.

The left display unit 24 includes, as components for causing the left eye LE of the user to visually recognize an image, an OLED unit 241 that emits image light and a left optical system 252 including a lens group for guiding the image light L emitted by the OLED unit 241. The image light L is guided to the left light guide plate 28 by the left optical system 252.

The OLED unit 241 includes an OLED panel 243 and an OLED driving circuit 245 that drives the OLED panel 243. The OLED panel 243 is a self-emitting display panel configured the same as the OLED panel 223. The OLED driving circuit 245 executes selection of a light emitting element included in the OLED panel 243 and energization to the light emitting element and causes the light emitting element of the OLED panel 243 to emit light according to the control by the HMD control section 141. The OLED driving circuit 245 is fixed to the rear side of a rear surface, that is, a light emitting surface of the OLED panel 243 by bonding or the like. The OLED driving circuit 245 may be configured by, for example, a semiconductor device that drives the OLED panel 243 and may be mounted on a substrate (not shown in the figure) fixed to the rear surface of the OLED panel 243. A temperature sensor 239 is mounted on the substrate.

The left optical system 252 includes a collimate lens that changes the image light L emitted from the OLED panel 243 to a light beam in a parallel state. The image light L changed to the light beam in the parallel state by the collimate lens is made incident on the left light guide plate 28. The left light guide plate 28 is an optical element in which a plurality of reflection surfaces that reflect the image light L are formed and is, for example, a prism. The image light L is guided to the left eye RE side through a plurality of times of reflection on the inside of the left light guide plate 28. A half mirror 281 (a reflection surface) located in front of the left eye LE is formed in the left light guide plate 28. The image light L is reflected on the half mirror 281 and emitted from the left light guide plate 28 toward the left eye LE. The image light L forms an image on the retina of the left eye LE and causes the user to visually recognize the image.

With this configuration, the HMD 100 functions as a see-through type display device. That is, the image light L reflected on the half mirror 261 and external light OL transmitted through the right light guide plate 26 are made incident on the right eye RE of the user. The image light L reflected on the half mirror 281 and the external light OL transmitted through the half mirror 281 are made incident on the left eye LE. In this way, the HMD 100 makes the image light L of the image processed on the inside and the external light OL incident on the eyes of the user to be superimposed one on top of the other. For the user, the outside scene is seen through the right light guide plate 26 and the left light guide plate 28. An image formed by the image light L is visually recognized over the outside scene.

The half mirrors 261 and 281 are image extracting sections that reflect image lights respectively output by the right display unit 22 and the left display unit 24 and extract images. The half mirrors 261 and 281 can be considered display sections.

Note that the left optical system 252 and the left light guide plate 28 are collectively referred to as "left light guide section" as well. The right optical system 251 and the right light guide plate 26 are collectively referred to as "right light guide section" as well. The configuration of the right light guide section and the left light guide section is not limited to the example explained above. Any system can be used as long as a virtual image is formed in front of the eyes of the user using the image lights. For example, a diffraction grating may be used or a semitransmitting reflection film may be used.

Figure 5:
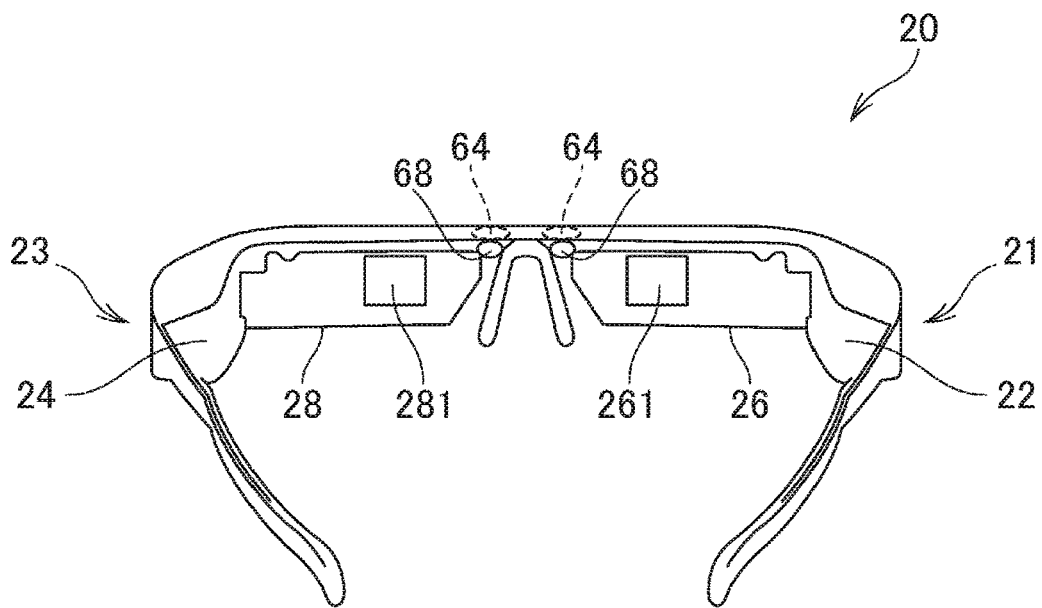
FIG. 5 is a perspective view showing the configuration of the image display section.
Figure 6:
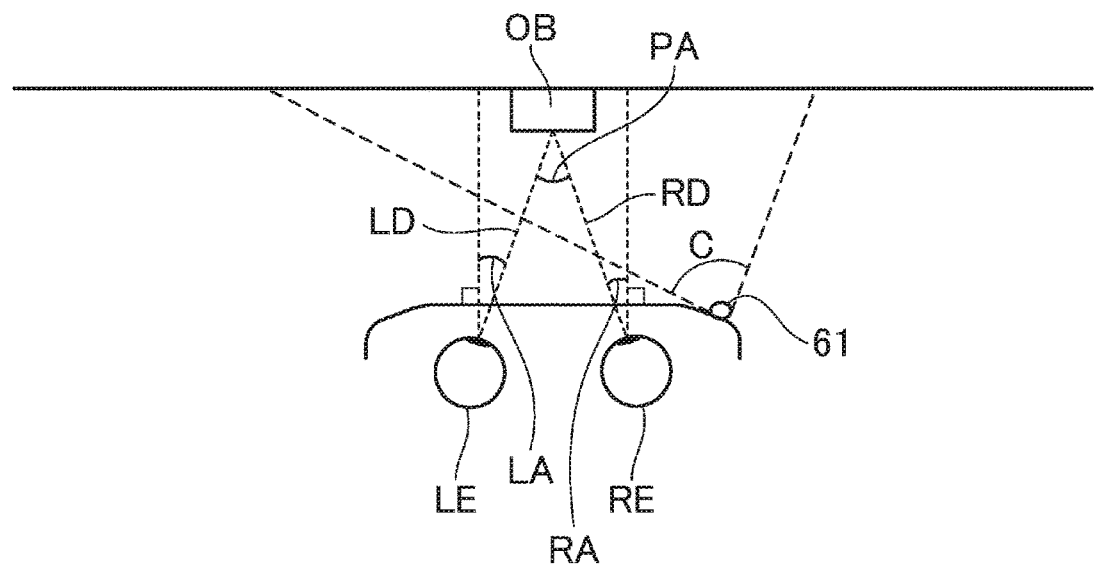
FIG. 6 is a schematic diagram showing correspondence between the image display section and an imaging range.

FIGS. 5 and 6 are diagrams showing a main part configuration of the image display section 20. FIG. 5 is a main part perspective view of the image display section 20 viewed from the head side of the user. Note that, in FIG. 5, illustration of the connection cable 40 is omitted. FIG. 6 is an explanatory diagram of an angle of view of the HMD camera 61.

In FIG. 5, a side in contact with the head of the user of the image display section 20, in other words, a side visible to the right eye RE and the left eye LE of the user is shown. In other words, the rear side of the right light guide plate 26 and the left light guide plate 28 is visible.

In FIG. 5, the half mirror 261 for irradiating image light on the right eye RE of the user and the half mirror 281 for irradiating image light on the left eye LE of the user are seen as substantially square regions. The entire right light guide plate 26 and left light guide plate 28 including the half mirrors 261 and 281 transmit external light as explained above. For this reason, for the user, an outside scene is visually recognized through the entire right light guide plate 26 and left light guide plate 28 and rectangular display images are visually recognized in the positions of the half mirrors 261 and 281.

The HMD camera 61 is disposed at the end portion on the right side in the image display section 20 and images a direction that both the eyes of the user face, that is, the front for the user. FIG. 6 is a diagram schematically showing the position of the HMD camera 61 in plan view together with the right eye RE and the left eye LE of the user. An angle of view (the imaging range) of the HMD camera 61 is indicated by C. Note that, although the angle of view C in the horizontal direction is shown in FIG. 6, an actual angle of view of the HMD camera 61 also expands in the up-down direction as in a general digital camera.

An optical axis of the HMD camera 61 is set in a direction including line of sight directions of the right eye RE and the left eye LE. An outside scene that can be visually recognized by the user in a state in which the user wears the HMD 100 is not always infinity. For example, as shown in FIG. 6, when the user gazes an object OB with both the eyes, lines of sight of the user are directed to the object OB as indicated by signs RD and LD in the figure. In this case, the distance from the user to the object OB is often approximately 30 cm to 10 m and more often approximately 1 m to 4 m. Therefore, concerning the HMD 100, standards of an upper limit and a lower limit of the distance from the user to the object OB during a normal use may be set. The standards may be calculated by researches and experiments or the user may set the standards. An optical axis and an angle of view of the HMD camera 61 are desirably set such that the object OB is included in the angle of view when the distance to the object OB during the normal use is equivalent to the set standard of the upper limit and when the distance is equivalent to the set standard of the lower limit.

In general, an angular field of view of a human is approximately 200 degrees in the horizontal direction and approximately 125 degrees in the vertical direction. In the angular field of view, an effective field of view excellent in an information reception ability is approximately 30 degrees in the horizontal direction and approximately 20 degrees in the vertical direction. Further, a stable field of fixation in which a gazing point gazed by the human is quickly and stably seen is approximately 60 to 90 degrees in the horizontal direction and approximately 45 to 70 degrees in the vertical direction. When the gazing point is the object OB shown in FIG. 6, a field of view of approximately 30 degree in the horizontal direction and approximately 20 degrees in the vertical direction centering on the lines of sight RD and LD is the effective field of view. A field of view of approximately 60 to 90 degrees in the horizontal direction and approximately 45 to 70 degrees in the vertical direction is the stable field of fixation. An angle of approximately 200 degrees in the horizontal direction and approximately 125 degrees in the vertical direction is the angular field of view. Further, an actual field of view visually recognized by the user through the image display section 20 and through the right light guide plate 26 and the left light guide plate 28 can be referred to as real field of view (FOV). In the configuration in this embodiment shown in FIG. 3, the real field of view is equivalent to an actual field of view visually recognized by the user through the right light guide plate 26 and the left light guide plate 28. The real field of view is narrower than the angular field of view and the stable field of fixation but is wider than the effective field of view.

The angle of view C of the HMD camera 61 desirably enables imaging of a range wider than the field of view of the user. Specifically, the angle of view C is desirably wider than at least the effective field of view of the user. The angle of view C is more desirably wider than the real field of view of the user. The angle of view C is still more desirably wider than the stable field of fixation. The angle of view C is most desirably wider than the angular field of view of both the eyes of the user.

The HMD camera 61 may include a so-called wide-angle lens as an imaging lens and may be capable of imaging a wide angle of view. The wide-angle lens may include lenses called super-wide angle lens and semi-wide angle lens. The wide-angle lens may be a single focus lens or may be a zoom lens. The HMD camera 61 may include a lens group including a plurality of lenses.

The distance sensors 64 are disposed to face forward in the center between the right light guide plate 26 and the left light guide plate 28. For example, the distance sensors 64 are configured to be capable of detecting the distance to an object located in the front direction of the user like the object OB shown in FIG. 6. The user wearing the HMD 100 turns the head to a gazing direction. Therefore, a gazing target can be considered to be present in the front of the image display section 20. Therefore, if the front of the image display section 20 is assumed to be a detecting direction 64A, the distance sensors 64 disposed in the center of the image display section 20 can detect the distance to the target gazed by the user.

As shown in FIG. 5, inner cameras 68 are disposed on the user side of the image display section 20. A pair of inner cameras 68 is provided in the center position between the right light guide plate 26 and the left light guide plate 28 to respectively correspond to the right eye RE and the left eye LE of the user. The inner cameras 68 are a pair of cameras that respectively images the right eye RE and the left eye LE of the user. The inner cameras 68 perform the imaging according to the control by the HMD control section 141. The HMD control section 141 analyzes captured image data of the inner cameras 68. For example, the HMD control section 141 detects reflected light on the eyeball surfaces of the right eye RE and the left eye LE and an image of the pupils from the captured image data of the inner cameras 68 and specifies a line of sight direction of the user. The HMD control section 141 can calculate a change in the line of sight direction of the user. The HMD control section 141 may detect respective eyeball motions of the right eye RE and the left eye LE.

The movement of the line of sight of the user can also be regarded as a movement of an imaginary visual point of the user.

The HMD control section 141 may extract an image of the eyelids of the right eye RE and the left eye LE of the user from the captured image data of the inner cameras 68 and detect eyelid motions or detect states of the eyelids. In this embodiment, a configuration is illustrated in which the image display section 20 includes the pair of inner cameras 68. However, for example, one inner camera 68 may be provided in the center position of the image display section 20. In this case, the one inner camera 68 desirably has an angle of view for enabling imaging of the right eye RE and the left eye LE. However, for example, only one of the right eye RE and the left eye LE may be imaged by the inner camera 68. That is, the HMD control section 141 may detect a line of sight direction, an eyeball motion, an eyelid motion, a state of the eyelid, and the like of either one of the right eye RE and the left eye LE.

When detecting the line of sight directions of the right eye RE and the left eye LE from the captured images of the inner cameras 68, the HMD control section 141 can calculate an angle of convergence of the right eye RE and the left eye LE. In FIG. 6, the angle of convergence is indicated by a sign PA. The angle of convergence PA corresponds to the distance to the object OB gazed by the user. That is, when the user three-dimensionally visually recognizes an image or an object, the angle of convergence of the right eye RE and the left eye LE is decided according to the distance to the visually recognized object. Therefore, it is possible to calculate the distance of the gazing of the user by detecting the angle of convergence. It is possible to induce a stereoscopic vision by displaying an image to induce the angle of convergence of the user.

The angle of convergence can be calculated from, for example, the captured image data of the inner cameras 68. For example, a line of sight direction of the right eye RE is calculated from the captured image data of the inner cameras 68. An angle LA in the line of sight direction of the right eye RE with respect to the front direction of the right eye RE is calculated from the line of sight direction. Similarly, a line of sight direction of the left eye LE is calculated from the captured image data of the inner cameras 68. An angle RA in the line of sight direction of the left eye LE with respect to the front direction of the left eye LE is calculated from the line of sight direction. The angle of convergence PA is equal to a sum of the angles LA and RA. It is possible to easily calculate the angle of convergence PA.

Figure 7:
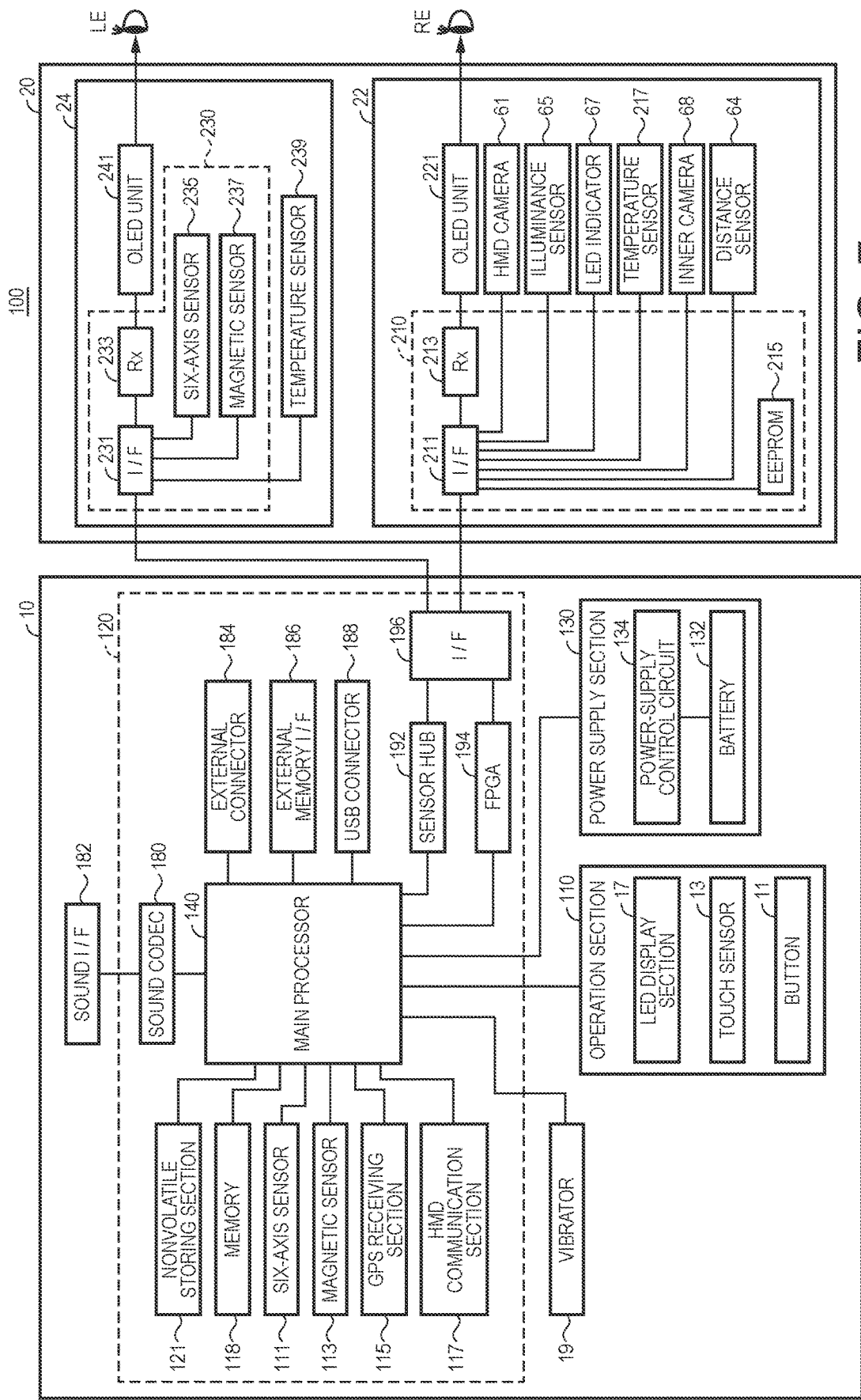
FIG. 7 is a block diagram of the HMD.

FIG. 7 is a block diagram showing the configurations of the sections configuring the HMD 100.

The control device 10 includes a main processor 140 that executes a computer program and controls the HMD 100. A memory 118 and a nonvolatile storing section 121 are connected to the main processor 140. An operation section 110 is connected to the main processor 140 as an input device. A six-axis sensor 111, a magnetic sensor 113, and a GPS 115 are connected to the main processor 140 as sensors. An HMD communication section 117 (a communication section), a sound codec 180, an external connector 184, an external memory interface 186, the USB connector 188, a sensor hub 192, and an FPGA 194 are connected to the main processor 140. These sections function as interfaces with the outside.

The main processor 140 is mounted on a controller board 120 incorporated in the control device 10. The memory 118, the nonvolatile storing section 121, and the like may be mounted on the controller board 120 in addition to the main processor 140. In this embodiment, the six-axis sensor 111, the magnetic sensor 113, the GPS 115, the HMD communication section 117, the memory 118, the nonvolatile storing section 121, the sound coded 180, and the like are mounted on the controller board 120. The external connector 184, the external memory interface 186, the USB connector 188, the sensor hub 192, the FPGA 194, and an interface 196 may be mounted on the controller board 120.

The memory 118 configures a work area where, when the main processor 140 executes a computer program, the main processor 140 temporarily stores the computer program to be executed and data to be processed. The nonvolatile storing section 121 is configured by a flash memory or an eMMC (embedded Multi Media Card). The nonvolatile storing section 121 stores the program to be executed by the main processor 140 and various data to be processed by the main processor 140 executing the computer program.

The main processor 140 detects contact operation on the operation surface of the track pad 14 and acquires an operation position on the basis of an operation signal input from the operation section 110.

The operation section 110 includes buttons 11, the touch sensor 13, and the LED display section 17. The touch sensor 13 detects touch operation on the track pad 14 and specifies an operation position of the detected touch operation. In this case, the operation section 110 outputs a control signal including data indicating the touch position on the track pad 14 to the main processor 140. When operation of the buttons 11 is performed and when the touch sensor 13 detects the touch operation, an operation signal is output from the operation section 110 to the main processor 140.

The LED display section 17 includes an LED (not shown in the figure) disposed immediately below the track pad 14 (FIG. 3) and a driving circuit that lights the LED. The LED display section 17 lights, flashes, and extinguishes the LED according to the control by the main processor 140.

The six-axis sensor 111 is a motion sensor (an inertial sensor) including a three-axis acceleration sensor and a three-axis gyro (angular velocity) sensor. As the six-axis sensor 111, an IMU (Inertial Measurement Unit) obtained by modularizing the sensors may be adopted.

The magnetic sensor 113 is, for example, a three-axis terrestrial magnetism sensor.

The GPS (Global Positioning System) 115 includes a not-shown GPS antenna, receives radio signals transmitted from GPS satellites, and detects a coordinate of a present position of the control device 10.

The six-axis sensor 111, the magnetic sensor 113, and the GPS 115 output detection values to the main processor 140 according to sampling cycles designated in advance. Alternatively, the six-axis sensor 111, the magnetic sensor 113, the GPS 115 output, in response to a request of the main processor 140, the detection values to the main processor 140 at timing designated by the main processor 140.

The HMD communication section 117 executes wireless communication between the HMD communication section 117 and an external apparatus. In this embodiment, the HMD communication section 117 executes wireless communication with the second communication section 372 included in the remote controller 350. The HMD communication section 117 includes an antenna, an RF circuit, a baseband circuit, and a communication control circuit. Alternatively, the HMD communication section 117 is configured by a device obtained by integrating the antenna, the RF circuit, the baseband circuit, and the communication control circuit. The HMD communication section 117 performs wireless communication conforming to a standard such as a Bluetooth or a wireless LAN (including Wi-Fi).

The sound interface 182 is an interface that inputs and outputs sound signals. In this embodiment, the sound interface 182 includes the connector 46 (FIG. 3) provided in the connection cable 40. The sound codec 180 is connected to the sound interface 182 and performs encoding/decoding of the sound signals input and output via the sound interface 182. The sound codec 180 may include an A/D converter that performs conversion from an analog sound signal into digital sound data and a D/A converter that performs conversion opposite to the conversion of the A/D converter. For example, the HMD 100 in this embodiment outputs sound with the right earphone 32 and the left earphone 34 and collects sound with the microphone 63. The sound codec 180 converts digital sound data output by the main processor 140 into an analog sound signal and outputs the analog sound signal via the sound interface 182. The sound codec 180 converts an analog sound signal input to the sound interface 182 into digital sound data and outputs the digital sound data to the main processor 140.

The external connector 184 is a connector to which an external apparatus communicating with the main processor 140 is connected. The external connector 184 is an interface to which the external apparatus is connected, for example, when the external apparatus is connected to the main processor 140 and debagging of a computer program executed by the main processor 140 and collection of a log of the operation of the HMD 100 are performed.

The external memory interface 186 is an interface to which a portable memory device is connectable. The external memory interface 186 includes, for example, a memory card slot, into which a card-type recording medium is inserted to enable reading of data, and an interface circuit. A size, a shape, and a standard of the card-type recording medium in this case are not limited and can be changed as appropriate.

The USB connector 188 includes a connector conforming to the USB standard and an interface circuit. A USB memory device, a smartphone, a computer, and the like can be connected to the USB connector 188. A size and a shape of the USB connector 188 and a version of the USB standard matching the USB connector 188 can be selected and changed as appropriate. When the HMD 100 and the remote controller 350 are connected by a USB cable, the USB connector 188 is connected to the remote controller 350.

The HMD 100 includes a vibrator 19. The vibrator 19 includes a motor (not shown in the figure) and an eccentric rotor (not shown in the figure). The vibrator 19 generates vibration according to the control by the main processor 140. For example, when operation on the operation section 110 is detected, when the power supply of the HMD 100 is turned on and off, or in other cases, the HMD 100 generates vibration with the vibrator 19 in a predetermined vibration pattern.

The sensor hub 192 and the FPGA 194 are connected to the image display section 20 via the interface (I/F) 196. The sensor hub 192 acquires detection values of the various sensors included in the image display section 20 and outputs the detection values to the main processor 140. The FPGA 194 executes processing of data transmitted and received between the main processor 140 and the sections of the image display section 20 and transmission of the data via the interface 196.

The right display unit 22 and the left display unit 24 of the image display section 20 are respectively connected to the control device 10. As shown in FIG. 3, in the HMD 100, the connection cable 40 is connected to the left holding section 23. A wire joined to the connection cable 40 is laid on the inside of the image display section 20. The right display unit 22 and the left display unit 24 are respectively connected to the control device 10.

The right display unit 22 includes a display unit board 210. An interface (I/F) 211 connected to the interface 196, a receiving section (Rx) 213 that receives data input from the control device 10 via the interface 211, and an EEPROM 215 (a storing section) are mounted on the display unit board 210.

The interface 211 connects the receiving section 213, the EEPROM 215, a temperature sensor 217, the HMD camera 61, an illuminance sensor 65, and an LED indicator 67 to the control device 10.

The EEPROM (Electrically Erasable Programmable ROM) 215 stores various data to enable the main processor 140 to read the data. The EEPROM 215 stores, for example, data concerning a light emission characteristic and a display characteristic of the OLED units 221 and 241 included in the image display section 20 and data concerning characteristics of the sensors included in the right display unit 22 or the left display unit 24. Specifically, the EEPROM 215 stores parameters related to gamma correction of the OLED units 221 and 241, data for compensating for detection values of the temperature sensors 217 and 239, and the like. These data are generated by a test during factory shipment of the HMD 100 and written in the EEPROM 215. After the shipment, the main processor 140 can perform processing using the data of the EEPROM 215.

The HMD camera 61 executes imaging according to a signal input via the interface 211 and outputs captured image data or a signal indicating an imaging result to the control device 10.

As shown in FIG. 3, the illuminance sensor 65 is provided at the end portion ER of the front frame 27 and disposed to receive external light from the front of the user wearing the image display section 20. The illuminance sensor 65 outputs a detection value corresponding to a received light amount (light reception intensity).

As shown in FIG. 3, the LED indicator 67 is disposed near the HMD camera 61 at the end portion ER of the front frame 27. The LED indicator 67 is lit during execution of imaging by the HMD camera 61 to inform that the imaging is being performed.

The temperature sensor 217 detects temperature and outputs a voltage value or a resistance value corresponding to the detected temperature as a detection value. The temperature sensor 217 is mounted on the rear surface side of the OLED panel 223 (FIG. 4). The temperature sensor 217 may be mounted on, for example, the same substrate as the OLED driving circuit 225. With this configuration, the temperature sensor 217 mainly detects the temperature of the OLED panel 223.

The inner cameras 68 execute imaging according to a signal input from the control device 10 via the interface 211 and outputs captured image data or a signal indicating an imaging result to the control device 10. In FIG. 7, one inner camera 68 is shown. However, the pair of inner cameras 68 shown in FIG. 5 may simultaneously operate. The respective pair of inner cameras 68 may be connected to the interface 211 and independently operate.

The distance sensors 64 execute distance detection according to a signal input from the control device 10 via the interface 211 and output a signal indicating a detection result to the control device 10. In FIG. 7, one distance sensor 64 is shown. However, the pair of distance sensors 64 shown in FIG. 5 may simultaneously operate. The respective pair of distance sensors 64 may be connected to the interface 211 and independently operate.

The receiving section 213 receives data transmitted by the main processor 140 via the interface 211. When receiving image data of an image displayed by the OLED unit 221, the receiving section 213 outputs the received image data to the OLED driving circuit 225 (FIG. 2).

The left display unit 24 includes a display unit board 230. An interface (I/F) 231 connected to the interface 196 and a receiving section (Rx) 233 that receives data input from the control device 10 via the interface 231 are mounted on the display unit board 230. A six-axis sensor 235 (a movement sensor) and a magnetic sensor 237 are mounted on the display unit board 230.

The interface 231 connects the receiving section 233, the six-axis sensor 235, the magnetic sensor 237, and the temperature sensor 239 to the control device 10.

The six-axis sensor 235 is a motion sensor (an inertial sensor) including a three-axis acceleration sensor and a three-axis gyro (angular velocity) sensor. As the six-axis sensor 235, an IMU (Inertial Measurement Unit) obtained by modularizing the sensors may be adopted.

The magnetic sensor 237 is, for example, a three-axis terrestrial magnetism sensor.

The temperature sensor 239 detects temperature and outputs a voltage value or a resistance value corresponding to the detected temperature as a detection value. The temperature sensor 239 is mounted on the rear surface side of the OLED panel 243 (FIG. 4). The temperature sensor 239 may be mounted on, for example, the same substrate as the OLED driving circuit 245. With this configuration, the temperature sensor 239 mainly detects the temperature of the OLED panel 243.

The temperature sensor 239 may be incorporated in the OLED panel 243 or the OLED driving circuit 245. The substrate may be a semiconductor substrate. Specifically, when the OLED panel 243 functioning as an Si-OLED is mounted as an integrated circuit on an integrated semiconductor chip together with the OLED driving circuit 245 and the like, the temperature sensor 239 may be mounted on the semiconductor chip.

The HMD camera 61, the distance sensors 64, the illuminance sensor 65, the inner cameras 68, and the temperature sensor 217 included in the right display unit 22 and the six-axis sensor 235, the magnetic sensor 237, and the temperature sensor 239 included in the left display unit 24 are connected to the sensor hub 192. The sensor hub 192 performs setting and initialization of sampling cycles of the sensors according to the control by the main processor 140. The sensor hub 192 executes energization to the sensors, transmission of control data, acquisition of detection values, and the like according to the sampling cycles of the sensors. The sensor hub 192 outputs detection values of the sensors included in the right display unit 22 and the left display unit 24 to the main processor 140 at preset timing. The sensor hub 192 may include a function of temporarily retaining the detection values of the sensors according to the timing of the output to the main processor 140. The sensor hub 192 may include a function of coping with differences in signal formats or data formats of output values of the sensors, converting the output values into data of a standardized data format, and outputting the data to the main processor 140.

The sensor hub 192 starts and stops energization to the LED indicator 67 according to the control by the main processor 140 and lights or flashes the LED indicator 67 according to timings when the HMD camera 61 starts and ends imaging.

The control device 10 includes a power supply section 130 and operates with electric power supplied from the power supply section 130. The power supply section 130 includes a chargeable battery 132 and a power-supply control circuit 134 that performs detection of a residual capacity of the battery 132 and control of charging to the battery 132. The power-supply control circuit 134 is connected to the main processor 140 and outputs a detection value of the residual capacity of the battery 132 or a detection value of a voltage to the main processor 140. The control device 10 may supply electric power to the image display section 20 on the basis of the electric power supplied by the power supply section 130. The main processor 140 may be capable of controlling a supply state of electric power from the power supply section 130 to the sections of the control device 10 and the image display section 20.

The HMD 100 may include an interface (not shown in the figure) that connects various external devices functioning as supply sources of contents. The interface may be an interface adapted to wired connection such as a USB interface, a micro USB interface, or an interface for a memory card or may be configured by a wireless communication interface. An external device in this case is an image supply device that supplies an image to the HMD 100. A personal computer (PC), a cellular phone terminal, a portable game machine, or the like is used. In this case, the HMD 100 can output an image and sound based on the content data input from the external devices.

FIG. 8 is a functional block diagram of an HMD storing section 170 and the HMD control section 141 configuring a control system of the control device 10. The HMD storing section 170 shown in FIG. 8 is a logical storing section configured by the nonvolatile storing section 121 (FIG. 7). The HMD storing section 170 may include the EEPROM 215. The main processor 140 executes computer programs, whereby the HMD control section 141 and the various functional sections included in the HMD control section 141 are formed by cooperation of software and hardware. The HMD control section 141 and the functional sections configuring the HMD control section 141 are configured by, for example, the main processor 140, the memory 118, and the nonvolatile storing section 121.

The HMD control section 141 executes various kinds of processing using data stored by the HMD storing section 170 and controls the HMD 100.

The HMD storing section 170 stores various data processed by the HMD control section 141. The HMD storing section 170 stores setting data 171, display setting data 172, captured image data 173, mobile machine identification data 174, moving area data 175, intra-area tag data 176, reference vehicle position data 177, and position history data 178.

The HMD storing section 170 may store contents data including contents including images and videos displayable by the image display section 20.

The setting data 171 includes various setting values related to the operation of the HMD 100. When the HMD control section 141 uses parameters, a determinant, an arithmetic expression, an LUT (Look UP Table), and the like when controlling the HMD 100, the parameters, the determinant, the arithmetic expression, the LUT (Look UP Table), and the like may be included in the setting data 171.

The display setting data 172 is data concerning an image displayed by the image display section 20. Specifically, the display setting data 172 includes setting concerning a display form of an image in the case in which the user pilots the mobile machine 310.

The display setting data 172 includes, for example, information such as a display size and a display position in the case in which image data received by the HMD communication section 117 from the remote controller 350 is displayed on the image display section 20. The HMD control section 141 is capable of displaying, on the image display section 20, images and regions allocated with specific functions such as icons, widgets, and a menu screen. The HMD control section 141 can realize a GUI (Graphical User Interface) using the images and the regions. The display setting data 172 may include information concerning necessity of the display, display positions, and the like of the images and the regions or may include image data for displaying the images and the regions.

The captured image data 173 is image data received from the remote controller 350. As explained above, the remote controller 350 transmits the captured image data of the mobile machine camera 335 of the mobile machine 310 and the image data generated on the basis of the captured image data. Therefore, the image data received by the HMD 100 from the remote controller 350 is not limited to the captured image data itself but is data related to the captured image data. The HMD control section 141 causes the HMD storing section 170 to store, as the captured image data 173, the image data received from the remote controller 350.

The mobile machine identification data 174 includes information for identifying the mobile machine unit 300 with which the control device 10 communicates. The mobile machine identification data 174 may include model names, model numbers, manufacturer names, manufacturing numbers, and peculiar IDs set during manufacturing of the mobile machine 310 and the remote controller 350. Alternatively, the mobile machine identification data 174 may include identification information such as an ID of the mobile machine 310 or the remote controller 350 set by the user. The mobile machine identification data 174 may include information for authentication used by the HMD 100 to authenticate the mobile machine unit 300. When the control device 10 communicates with the remote controller 350 through the HMD communication section 117, the mobile machine identification data 174 may include information necessary for the communication. Specifically, the mobile machine identification data 174 may include authentication information for communication such as a network address, a network ID, and a password.

The moving area data 175 includes information concerning a moving area set in advance as a region to which the mobile machine 310 is moved (flown). In this embodiment, the mobile machine 310 is moved in the preset moving area. An image is displayed on the image display section 20 on the basis of a captured image captured by the mobile machine 310 during the movement. The moving area data 175 includes information such as the position and the size of the moving area where the mobile machine 310 is moved. The position and the size of the moving area are specified by a position and a size in a real space, which is an actual space. The position and the size of the moving area may be specified in the height direction. Specifically, a range of the altitude of the moving area may be set.

The position of the moving area included in the moving area data 175 may be represented by altitude and longitude capable of indicating an absolute position in the real space or may be represented as a relative position with respect to a reference set in the real space.

The intra-area tag data 176 includes information concerning tags set in the moving area. The tags serving as indicators of the position of the mobile machine 310 are set in the moving area. The intra-area tag data 176 includes, concerning the tags set in the moving area, identification information such as IDs for identifying the tags and information indicating the positions of the tags in association with each other. At least one of the tags set in the moving area is a tag indicating a reference position serving as a reference in processing for estimating a position of the mobile machine 310 in the moving area. The intra-area tag data 176 includes, concerning the tag indicating the reference position, information indicating the reference position, information indicating the position of the tag, and identification information of the tag in association with one another. The position of the tag may be represented by latitude and longitude capable of indicating an absolute position in the real space or may be represented as a relative position with respect to a reference set in the moving area.

The reference vehicle position data 177 includes information indicating a reference vehicle position of the mobile machine 310 in the moving area. As explained below, the reference vehicle position of the mobile machine 310 is set by the control by the HMD control section 141 using the tag indicating the reference position set in the moving area. The reference vehicle position data 177 includes information concerning the set reference vehicle position.

The position history data 178 includes a history of the position of the mobile machine 310. The position history data 178 may be a history of the position of the mobile machine 310 estimated by a position estimating section 155 explained below. The position history data 178 may include information concerning the position of the mobile machine 310 transmitted to the HMD 100 by the remote controller 350.

The HMD control section 141 includes functions of an operating system (OS) 143, an image processing section 145, a display control section 147, an imaging control section 149, a detection control section 151, a communication control section 153, a position estimating section 155, an operation detecting section 157, and a command generating section 159.

The function of the operating system 143 is a function of a control program stored by the HMD storing section 170. The other sections of the HMD control section 141 are functions of application programs executed on the operating system 143.

The image processing section 145 generates, on the basis of image data of an image or a video displayed by the image display section 20, signals transmitted to the right display unit 22 and the left display unit 24. The signals generated by the image processing section 145 may be a vertical synchronization signal, a horizontal synchronization signal, a clock signal, an analog image signal, and the like.

The image processing section 145 may perform, according to necessity, resolution conversion processing for converting the resolution of the image data into resolution suitable for the right display unit 22 and the left display unit 24. The image processing section 145 may execute, for example, image adjustment processing for adjusting the luminance and the chroma of the image data and 2D/3D conversion processing for creating 2D image data from 3D image data or creating 3D image data from 2D image data. When executing these kinds of image processing, the image processing section 145 generates a signal for displaying an image on the basis of image data after the processing and transmits the signal to the image display section 20 via the connection cable 40.

Besides being configured by the main processor 140 executing a computer program, the image processing section 145 may be configured by hardware (e.g., a DSP (Digital Signal Processor)) separate from the main processor 140.

The display control section 147 generates a control signal for controlling the right display unit 22 and the left display unit 24 and controls, with the control signal, generation and emission of image lights by the right display unit 22 and the left display unit 24. Specifically, the display control section 147 controls the OLED driving circuits 225 and 245 to execute display of images by the OLED panels 223 and 243. The display control section 147 performs, for example, control of timing when the OLED driving circuits 225 and 245 perform drawing on the OLED panels 223 and 243 on the basis of signals output by the image processing section 145 and control of the luminance of the OLED panels 223 and 243.

The display control section 147 causes, on the basis of the display setting data 172, the image display section 20 to display various images. For example, the display control section 147 causes the image display section 20 to display icons, widgets, menus, and the like according to setting of the display setting data 172.

The imaging control section 149 controls the HMD camera 61 to execute imaging, generates captured image data, and temporarily stores the captured image data in the HMD storing section 170. When the HMD camera 61 is configured as a camera unit including a circuit that generates captured image data, the imaging control section 149 acquires the captured image data from the HMD camera 61 and temporarily stores the captured image data in the HMD storing section 170.

The imaging control section 149 may control the inner cameras 68 to image the right eye RE and the left eye LE of the user. In this case, the HMD control section 141 may analyze, according to the control by the imaging control section 149, the captured image data captured by the inner cameras 68 and detect motions of the right eye RE and the left eye LE of the user. In this case, the HMD control section 141 may calculate a moving direction, a movement amount, and the like concerning each of the right eye RE and the left eye LE or either one of the right eye RE and the left eye LE.

The detection control section 151 acquires detection values of the various sensors included in the HMD 100. The sensors controlled by the detection control section 151 includes, for example, the six-axis sensor 111, the magnetic sensor 113, the temperature sensor 217, the six-axis sensor 235, the magnetic sensor 237, the distance sensors 64, and the illuminance sensor 65. The sensors may include the GPS 115.

The detection control section 151 functions as a receiving section and receives operation on the HMD 100. The detection control section 151 detects operation on the buttons 11 and the touch sensor 13 included in the control device 10. The detection control section 151 detects operation by movement of the control device 10 on the basis of detection values and/or changes in the detection values of the six-axis sensor 111 and the magnetic sensor 113 included in the control device 10. The detection control section 151 detects operation by movement of the image display section 20 on the basis of detection values and/or changes in the detection values of the six-axis sensor 235 and the magnetic sensor 237 included in the image display section 20. For example, the detection control section 151 detects the operation when the movement of the control device 10 and/or the image display section 20 corresponds to a movement of a preset form.

The communication control section 153 controls the HMD communication section 117 to execute communication between the HMD communication section 117 and the remote controller 350.

The position estimating section 155 estimates a position of the mobile machine 310. The position estimating section 155 may specify the position of the mobile machine 310 on the basis of position information of the mobile machine 310 transmitted by the remote controller 350. In a state in which the mobile machine 310 is located in the moving area, the position estimating section 155 performs processing for estimating a position of the mobile machine 310 on the basis of captured image data of the mobile machine 310 or image data generated by the remote controller 350 on the basis of the captured image data of the mobile machine 310.

The operation detecting section 157 (a position designating section) detects position indication operation by the user wearing the image display section 20. The operation detecting section 157 analyzes captured image data captured by the HMD camera 61 according to the control by the imaging control section 149 and extracts an image of an indicator (a finger, a hand, or another part of the body of the user, another object, etc.) from the captured image data. The operation detecting section 157 specifies the position of the image of the indicator in the captured image data and converts the specified position into a relative position with respect to the image display section 20. The operation detecting section 157 outputs the position after the conversion as an operation position. Consequently, the user wearing the image display section 20 can perform the position indication operation by locating the indicator in the imaging range of the HMD camera 61 or moving the indicator in the imaging range.

The command generating section 159 generates a command according to the operation detected by the detection control section 151 or the operation detected by the operation detecting section 157. The command generated by the command generating section 159 is a command for operating the mobile machine 310 or the remote controller 350. The command is, for example, a command for instructing the mobile machine 310 to perform a routine operation or a command for instructing the remote controller 350 to transmit captured image data. The command generate by the command generating section 159 is transmitted to the remote controller 350 by the HMD communication section 117 and received by the remote controller 350. The remote controller 350 receives the command transmitted by the HMD 100 and transmits the command to the mobile machine 310. Note that among the commands generated by the command generating section 159, a command related to the operation of the mobile machine 310 may be a command for instructing transmission of a command from the remote controller 350 to the mobile machine 310. In this case, the command generating section 159 only has to generate a command interpretable by the remote controller 350. That is, the command may be a command for instructing the remote controller 350 to perform operation for generating a command such as a routine command to the mobile machine 310.

Figure 9:
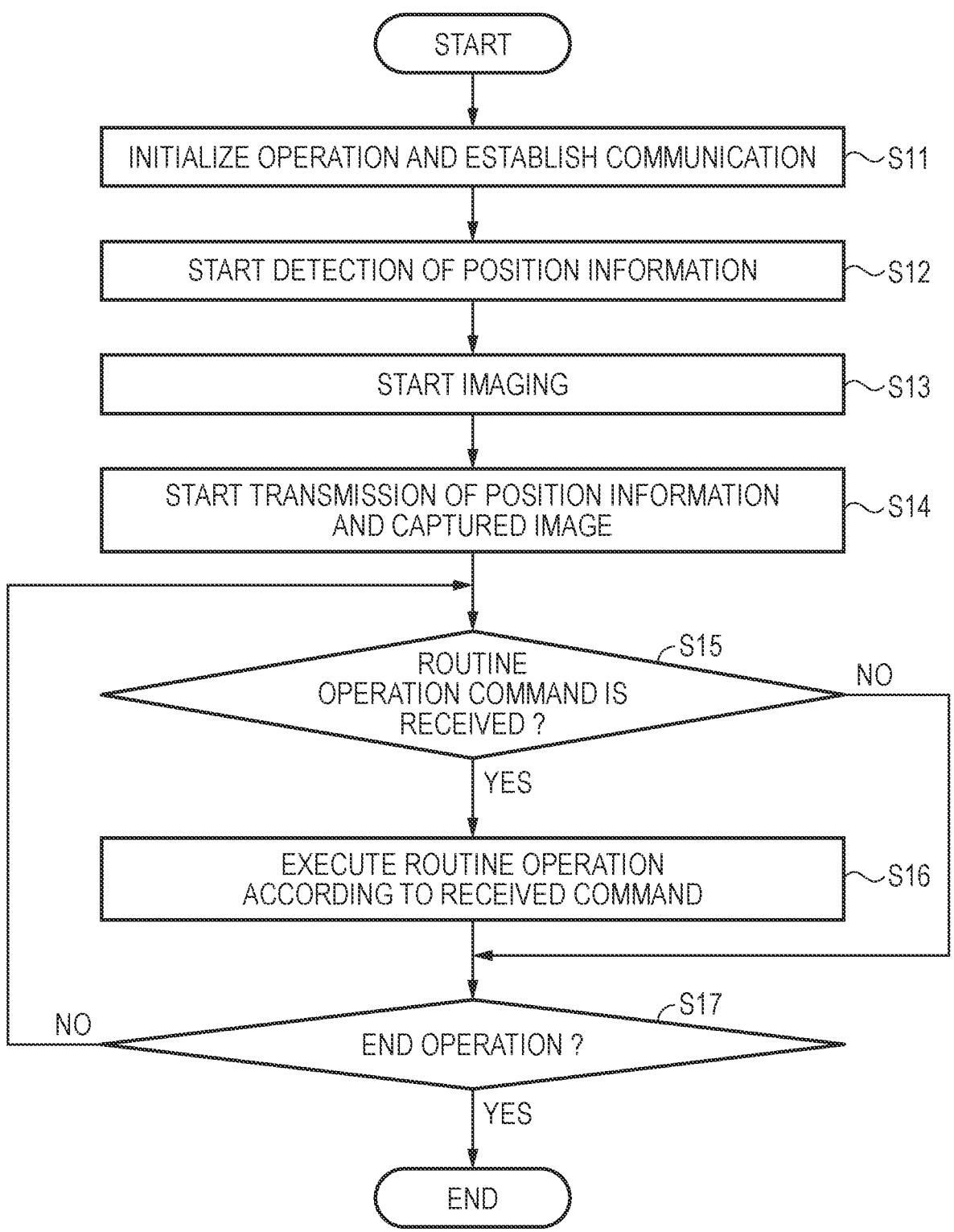
FIG. 9 is a flowchart for explaining the operation of a mobile machine.
Figure 10:
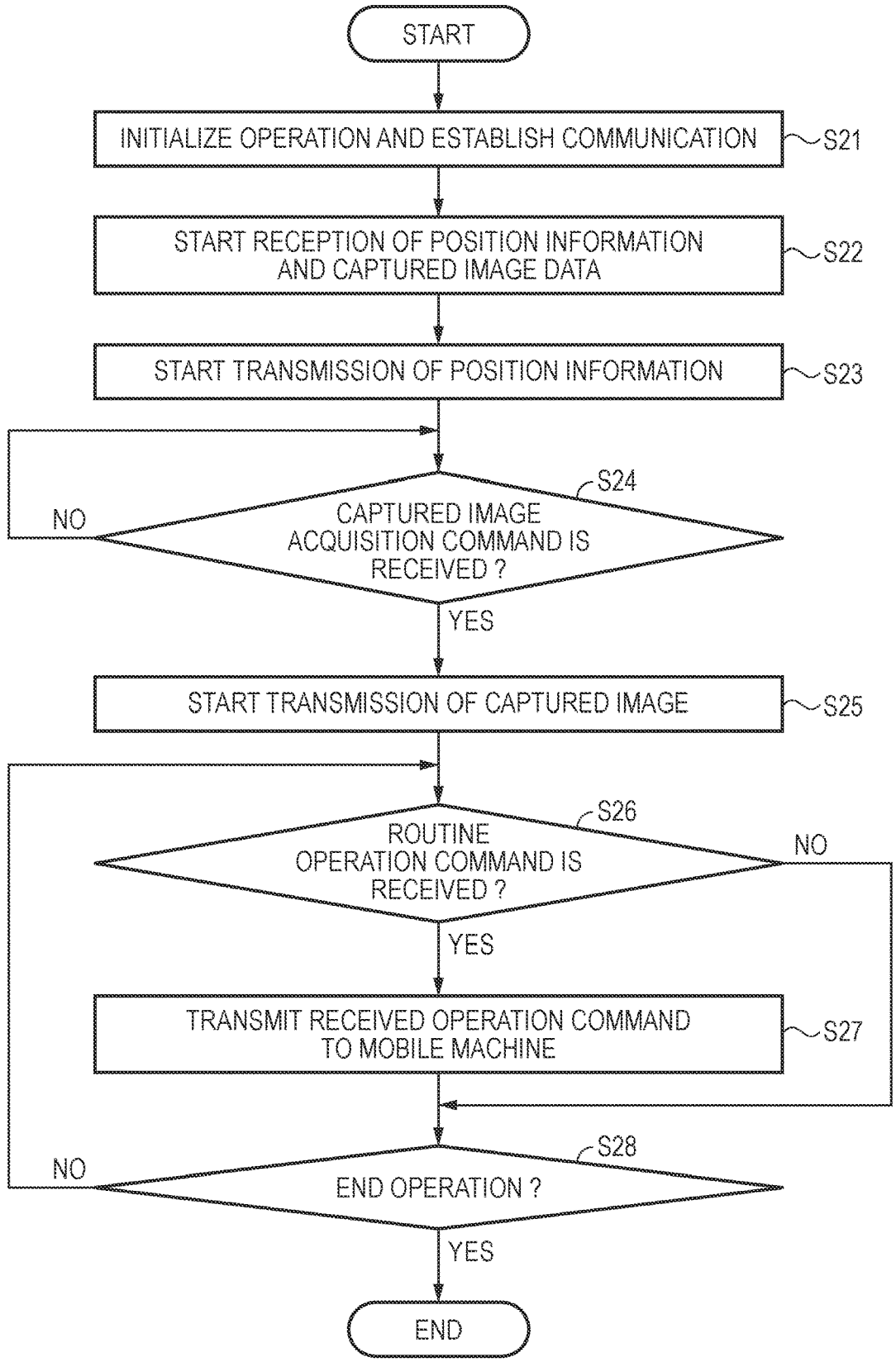
FIG. 10 is a flowchart for explaining the operation of a remote controller.
Figure 11:
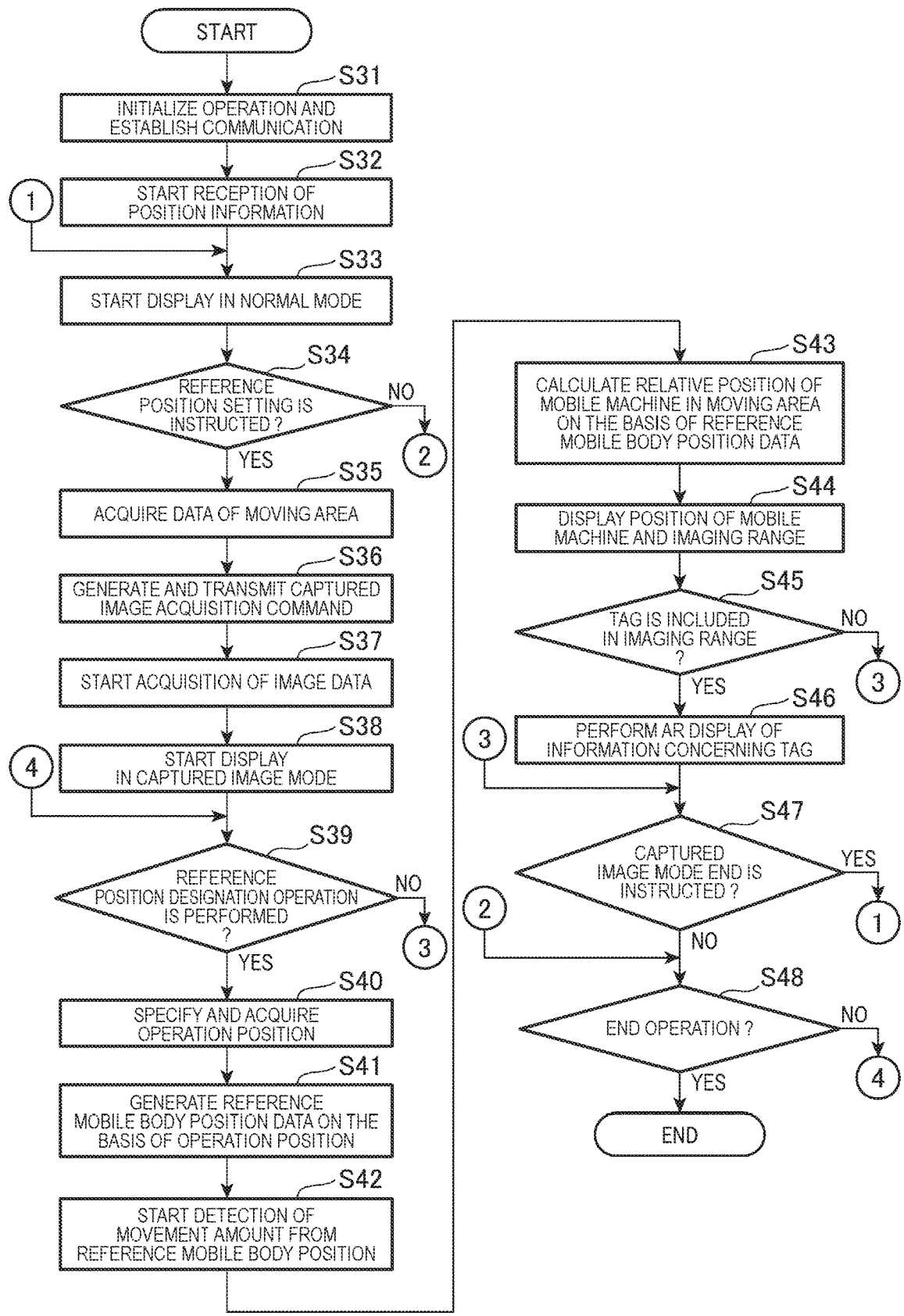
FIG. 11 is a flowchart for explaining the operation of the HMD.
Figure 12:
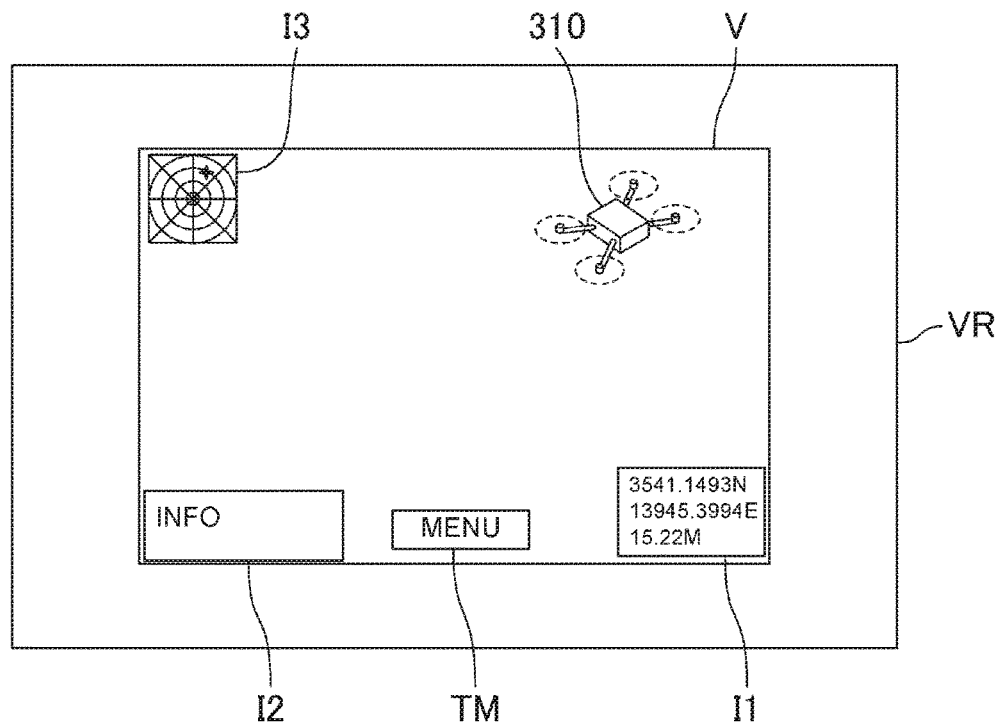
FIG. 12 is a diagram showing a display example of the HMD.
Figure 13:
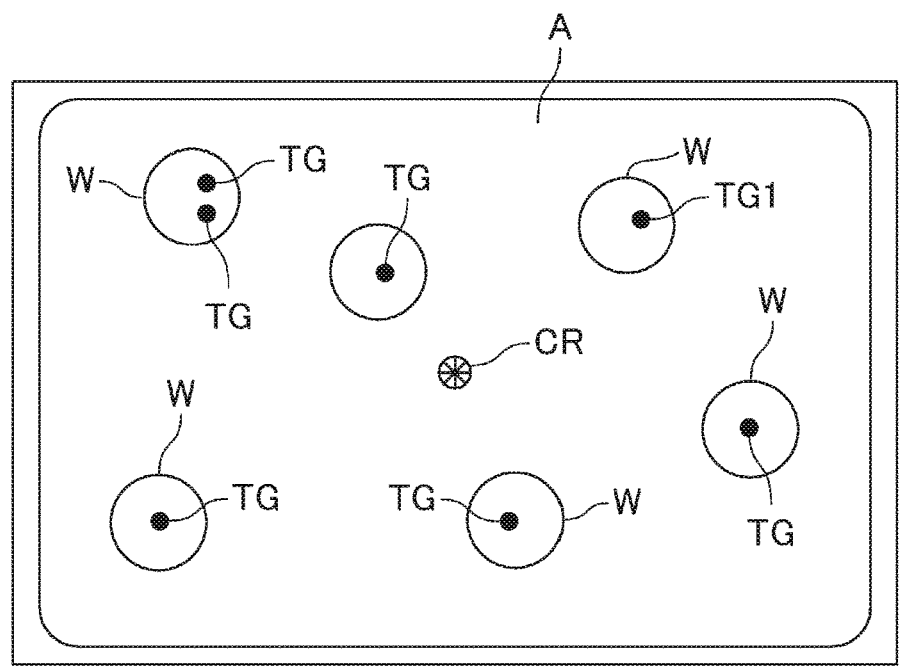
FIG. 13 is a schematic diagram showing an example of a moving area of the mobile machine.
Figure 14:
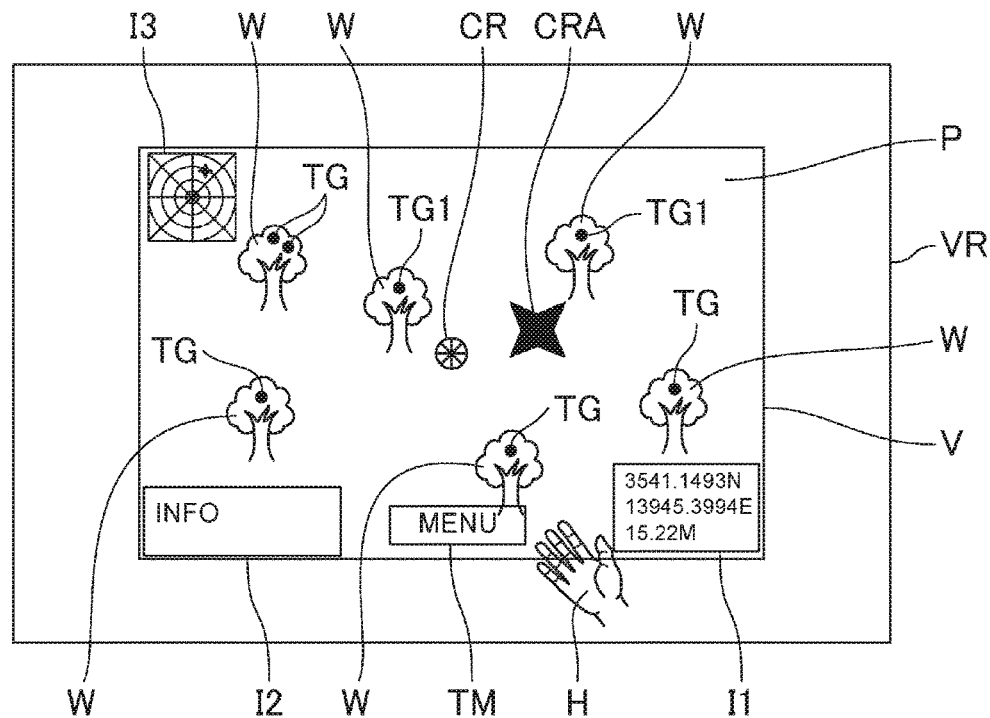
FIG. 14 is a diagram showing a display example of the HMD.

FIGS. 9, 10, and 11 are flowcharts for explaining the operations of the sections of the mobile machine control system 1. FIGS. 12 and 14 are diagrams showing display examples of a screen displayed on the image display section 20 according to the operation of the mobile machine control system 1. FIG. 13 is a schematic diagram showing an example of a moving area of the mobile machine 310. The operation of the mobile machine control system 1 is explained with reference to the drawings.

FIG. 9 is a flowchart for explaining the operation of the mobile machine 310.

The mobile-machine control section 341 starts operation when a power supply of the mobile machine 310 is turned on. The mobile-machine control section 341 executes initialization of the sections including the motor controller 347 and operation for establishing communication between the mobile-machine control section 341 and the remote controller 350 (step S11).

The mobile-machine control section 341 starts position detection by the GPS device 344 and starts acquisition of position information detected by the GPS device 344 (step S12). The mobile-machine control section 341 controls the camera control section 346 to start imaging by the mobile machine camera 335 (step S13).

The mobile-machine control section 341 starts processing for transmitting the position information acquired from the GPS device 344 and captured image data of the mobile machine camera 335 to the remote controller 350 (step S14). The mobile-machine control section 341 may include, in the position information, a detection value of the posture sensor 348 and transmit the detection value. The mobile-machine control section 341 may include, in the position information, control information including remaining battery power and transmit the control information. In an operation example shown in FIG. 9, the mobile-machine control section 341 continuously executes the transmission of the position information and the captured image data at a preset cycle after step S14.

The mobile-machine control section 341 determines whether a routine operation command transmitted by the remote controller 350 is received by the mobile-machine communication section 343 (step S15). When the routine operation command is received (Yes in step S15), the mobile-machine control section 341 causes the flight control section 345 to execute a routine operation designated by the received command (step S16). Thereafter, the mobile-machine control section 341 determines whether to end the operation (step S17). When not ending the operation (No in step S17), the mobile-machine control section 341 returns to step S15.

When the routine operation command is not received (No in step S15), the mobile-machine control section 341 shifts to step S17.

FIG. 10 is a flowchart for explaining the operation of the remote controller 350.

The CTL-arithmetic control section 360 starts operation when a power supply of the remote controller 350 is turned on. The CTL-arithmetic control section 360 executes initialization of the sections of the remote controller 350 and operation for establishing communication between the CTL-arithmetic control section 360 and the mobile machine 310 (step S21). In step S21, the CTL-arithmetic control section 360 may execute processing for establishing communication between the CTL-arithmetic control section 360 and the HMD 100 through the second communication section 372.

The CTL-arithmetic control section 360 starts reception of position information and captured image data from the mobile machine 310 (step S22). The CTL-arithmetic control section 360 temporarily stores the position information and the captured image data received from the mobile machine 310 in the CTL storing section 363. The CTL-arithmetic control section 360 starts operation for transmitting the position information received from the mobile machine 310 to the HMD 100 (step S23). As explained above, the position information transmitted by the CTL-arithmetic control section 360 is not limited to the position information detected by the mobile machine 310 with the GPS device 344 and may include a detection value of the posture sensor 348 or may include control information.

The CTL-arithmetic control section 360 determines whether a command for instructing transmission of the captured image data is received from the HMD 100 (step S24). When the command is not received (No in step S24), the CTL-arithmetic control section 360 stays on standby until the command is received. When the command for instructing transmission of the captured image data is received (Yes in step S24), the CTL-arithmetic control section 360 starts a transmission operation. That is, the CTL-arithmetic control section 360 starts operation for transmitting the captured image data received from the mobile machine 310 or image data generated on the basis of the received captured image data to the HMD 100 (step S25). For example, concerning the captured image data received from the mobile machine 310, the CTL-arithmetic control section 360 may perform image processing such as conversion of resolution, conversion of a frame rate, and conversion of an image format and transmit image data after the processing to the HMD 100.

The CTL-arithmetic control section 360 determines whether a command for instructing the routine operation is received from the HMD 100 (step S26). When the command for instructing the routine operation is received (Yes in step S26), the CTL-arithmetic control section 360 transmits a routine operation command for instructing the routine operation to the mobile machine 310 (step S27). Thereafter, the CTL-arithmetic control section 360 determines whether to end the operation (step S28). When not ending the operation (No in step S28), the CTL-arithmetic control section 360 returns to step S26. When the command for instructing the routine operation is not received (No in step S26), the CTL-arithmetic control section 360 shifts to step S28.

FIG. 11 is a flowchart for explaining the operation of the HMD 100.

The HMD control section 141 starts operation when the power supply of the HMD 100 is turned on. The HMD control section 141 performs initialization of the sections of the HMD 100 and establishes communication between the HMD control section 141 and the remote controller 350 (step S31). Subsequently, the HMD control section 141 starts operation for receiving position information from the remote controller 350 (step S32).

The HMD control section 141 displays an image on the image display section 20 in a normal mode. As display modes in the image display section 20, in this embodiment, the HMD control section 141 can switch the normal mode and a captured image mode. The captured image mode is an operation mode in which an image based on captured image data captured by the mobile machine 310 with the mobile machine camera 335 is displayed by the image display section 20. The normal mode is a display mode in which the captured image data of the mobile machine 310 is not displayed in a state in which the mobile machine unit 300 and the HMD 100 execute communication. Note that the HMD 100 is capable of performing, for example, display for reproducing contents data stored in the HMD storing section 170 in a state in which the HMD 100 does not communicate with the mobile machine unit 300. The normal mode and the captured image mode are display modes in the case in which the user of the HMD 100 operates the remote controller 350 to pilot the mobile machine 310.

FIG. 12 is a diagram showing a display example of the HMD 100. FIG. 12 shows a display example of the image display section 20 in the normal mode. In the figure, a sign VR indicates a visual field of the user wearing the image display section 20. A sign V indicates a region where it is possible to cause the user to visually recognize an image with the half mirrors 261 and 281, in other words, a display region where the image display section 20 can display an image.

In the normal mode, information display sections I1, I2, and I3 and a menu tab TM are disposed in the display region V. Position information of the mobile machine 310 is displayed in the information display section I1. Various kinds of information concerning the operation of the mobile machine 310 are displayed in the information display section I2. For example, warning of remaining battery power of the mobile machine 310 is displayed in the information display section I2. An image showing the position of the mobile machine 310 as a position in a preset range is displayed in the information display section I3. The menu tab TM is an image for operation for performing instruction for invoking a menu screen (not shown in the figure) for performing setting and the like of the HMD 100. For example, when the HMD control section 141 detects operation of the indicator on the menu tab TM on the basis of a captured image of the HMD camera 61, the menu screen can be displayed.

In the normal mode, the information display sections I1, I2, and I3 and the menu tab TM are disposed in positions avoiding the center of the display region V. Therefore, in a most portion including the center of the display region V, it is possible to visually recognize an outside scene through the image display section 20. In this way, in the normal mode, display suitable for a purpose of visually recognizing the outside scene, that is, the real space is performed. In the example shown in FIG. 12, it is possible to visually recognize the flying mobile machine 310 with visual observation. The user can visually recognize the mobile machine 310, operate the remote controller 350, and pilot the mobile machine 310.

In step S33, the HMD control section 141 starts display in the normal mode. The HMD control section 141 displays the position information received from the remote controller 350 in the information display section I1 and displays an image indicating the position of the mobile machine 310 on the basis of the received position information in the information display section I3. When control information is included in the position information, the HMD control section 141 may display, for example, the control information or a message generated by the HMD control section 141 on the basis of the control information in the information display section I2.

The HMD control section 141 determines whether setting of a reference position is instructed by operation detected by the operation detecting section 157 (step S34). The setting of the reference position is processing for, when the mobile machine 310 flies in the moving area, performing association of the position of the mobile machine 310 and the moving area. More specifically, the setting of the reference position is a kind of calibration for associating a range shown in captured image data of the mobile machine 310, that is, an imaging range and a position of the moving area in order to specify the position of the mobile machine 310 using the captured image data of the mobile machine 310. After the setting of the reference position is performed, it is possible to calculate, from an image of the real space shown in the captured image data of the mobile machine 310, a position and a direction of the mobile machine 310 at the time when the imaging is performed.

In the schematic diagram of FIG. 13, a moving area A where a plurality of trees are planted is shown as an example of the moving area where the mobile machine 310 is moved. The schematic diagram of FIG. 13 is a plan view of the moving area A viewed from above. Signs W indicate the trees. Signs TG indicate tags attached to the trees W. The tags TG function as marks attached to trunks and branches of the trees W. The shape and the size of the tags TG are optional but are desirably a shape and a size for enabling detection of images of the tags TG in a captured image of the mobile machine camera 335. In an example shown in FIG. 13, one or two tags TG are attached to one tree W. Identification information (referred to as ID) for identification is given to the respective tags TG in the moving area A. The positions of the tags TG in the moving area A and the identification information of the tags TG are included in the intra-area tag data 176 (FIG. 8).

In the moving area A, a reference tag CR indicating the reference position is set. The reference tag CR is a kind of the tag TG. However, the reference tag CR is set in a position desirably set as the reference position in the moving area A. As explained below, captured image data of the mobile machine 310 is used in the processing for setting the reference position. Therefore, the reference tag CR is desirably set in a position where the mobile machine 310 can easily perform imaging. The reference tag CR is desirably set in a position not hidden by shadows of the trees W and other objects in the moving area A. The reference tag CR is a kind of the tag TG. Therefore, like the tags TG, identification information of the reference tag CR and the position of the reference tag CR are included in the intra-area tag data 176 and stored in the HMD storing section 170.

Note that FIG. 13 is only an example of the moving area A. The tags TG are not limited to tags attached to the trees W. For example, the tags TG may be set on the ground or a floor surface in the moving area A. The moving area A may be indoors. In this case, the tags TG and the reference tag CR may be set on a wall surface.

When the setting of the reference position is not instructed (No in step S34), the HMD control section 141 shifts to step S48 explained below. When the setting of the reference position is instructed (Yes in step S34), the HMD control section 141 acquires data concerning the moving area A from the HMD storing section 170 (step S35). Specifically, the HMD control section 141 acquires the moving area data 175, the intra-area tag data 176, and the reference vehicle position data 177.

The HMD control section 141 generates a command for instruction acquisition of a captured image and transmits the command to the remote controller 350 (step S36) and starts acquisition of image data transmitted by the remote controller 350 according to the command (step S37). The HMD control section 141 switches the display mode to the captured image mode and starts display of an image based on the image data transmitted by the remote controller 350 (step S38).

FIG. 14 is a diagram showing a display example of the HMD 100. FIG. 14 shows a display example of the image display section 20 in the captured image mode. In the figure, the visual field VR and the display region V are as explained with reference to FIG. 12.

In the captured image mode, an image P based on image data received from the remote controller 350 is displayed in the center of the display region V. A display size and a display position of the image P are set in advance. An example in which the image P is displayed over the entire display region V is shown in FIG. 14.

In the captured image mode, as in the normal mode, the information display sections I1, I2, and I3 and the menu tab TM can be disposed in the display region V. Display positions of the information display sections I1, I2, and I3 and the menu tab TM are positions avoiding the center of the display region V. Therefore, visibility of the image P is not greatly spoiled. When the image P is displayed over the entire display region V as in the example shown in FIG. 14, the information display sections I1, I2, and I3 and the menu tab TM are displayed to overlap the image P. When the image P is displayed in a part of the display region V, the information display sections I1, I2, and I3 and the menu tab TM may be displayed in positions avoiding the image P. The detection control section 151 may temporarily turn off the display of the information display sections I1, I2, and I3 and the menu tab TM on the basis of operation detected by the detection control section 151.

In the captured image mode as well, since the image display section 20 transmits external light, it is possible to visually recognize an outside scene through the image P. Therefore, even during the execution of the captured image mode, since the user can visually recognize the mobile machine 310 in the real space, the user can pilot the mobile machine 310 with visual observation. Note that, in the captured image mode, when the remote controller 350 is operated, the HMD control section 141 may detect the operation of the remote controller 350 and control display to improve the visibility of the outside scene. Specifically, the HMD control section 141 may perform image processing or light emission control of the OLED units 221 and 241 and reduce display luminance of the image P displayed on the image display section 20 to thereby improve the visibility of the outside scene.

When instructing the reference position setting, the user pilots the mobile machine 310 and moves the mobile machine 310 to a position where an image for setting of a reference position can be captured. The position where the image for setting of a reference position can be captured is referred to as reference vehicle position of the mobile machine 310. The reference vehicle position is specified by a condition concerning a captured image captured by the mobile machine 310. In this embodiment, the condition is that it is possible to image a range including the reference tag CR in the moving area A and it is possible to image a range including setting positions of at least a half or more of the tags TG. The user operates the remote controller 350 and adjusts the position of the mobile machine 310 to a position satisfying the condition of the reference vehicle position. The user can perform work of the adjustment, that is, the operation of the remote controller 350 while visually recognizing a captured image of the mobile machine 310 in the captured image mode. Therefore, difficulty of the work is low. The HMD control section 141 may generate, with the function of the command generating section 159, a command for piloting the mobile machine 310, transmit the command to the remote controller 350, and assist operation for moving the mobile machine 310 to the reference vehicle position. The command generating section 159 may generate and transmit a command for instructing the routine operation for moving the mobile machine 310 to the reference vehicle position and automatically move the mobile machine 310 to the reference vehicle position.

In FIG. 14, a state is shown in which the image P based on captured image data in the case in which the mobile machine 310 moves to the reference vehicle position is displayed. In the image P, the trees W planted in the moving area A are shown. It is evident that a range including the positions of a plurality of tags TG is imaged. The reference tag CR is imaged.

The HMD control section 141 determines whether reference position designation operation performed by the user is detected by the detection control section 151 (step S39). The reference position designation operation is operation for designating the position of the reference tag CR in a captured image of the mobile machine 310. The reference position designation operation is, for example, operation for moving an indicator such as a hand or a finger of the user in the imaging range of the HMD camera 61 or position indication operation for the track pad 14.

In FIG. 14, an indicator H for performing the reference position designation operation is shown. Since the indicator H is an object in the real space, the indicator H is visually recognized through the image display section 20. The HMD control section 141 detects the position of the indicator H with the detection control section 151 and displays a reference position marker CRA according to the detected position. When the user moves the indicator H, the reference position marker CRA moves according to a detected position of the indicator H, that is, an operation position. The user performs operation with the indicator H such that the reference position marker CRA overlaps the reference tag CR in the image P. When the user performs decision operation in a state in which the reference position marker CRA overlaps the reference tag CR, the position of the reference position marker CRA is specified as a position designated by the user.

The reference position marker CRA functions as a so-called pointer. The reference position marker CRA is displayed in a position corresponding to operation by the user (the position of the indicator H). The reference position marker CRA can also be an AR image or an AR marker stereoscopically displayed like 3D. For example, an auto-focus technique used in focusing of a digital camera may be applied to make it easy to see that the reference position marker CRA overlaps a real reference marker when the user performs the decision operation in a state in which the reference position marker CRA is close to the reference tag CR. An assisting operation may be performed to, for example, surround a target range with a circle and display the target range on the basis of the position of the indicator H, flash the reference position marker CRA when a target is captured, align and display the reference position marker CRA on a target object in the target range, and output sound when the reference position marker CRA overlaps the target object in the target range. Consequently, for example, in an orchard or a field where fruit trees such as persimmons are located, the heights and the like of trees such as the persimmons, which are target objects, may be displayed like contour lines. When a large field or a town is set as a target, the reference tag CR is not limited to one. A plurality of reference tags CR may be present.

When detecting the reference position designation operation performed by the user (Yes in step S39), the HMD control section 141 specifies and acquires an operation position designated by the user (step S41). The position acquired in step S41 is a position of the reference position marker CRA designated by the user. The HMD control section 141 generates the reference vehicle position data 177 concerning the reference vehicle position on the basis of the position of the reference position marker CRA (step S41).

In step S41, first, the HMD control section 141 specifies relative positions of the image P and the reference position marker CRA. Subsequently, the HMD control section 141 detects an image of an object serving as a mark included in the image P and specifies the position of the detected image. The object serving as the mark is, for example, the tree W or the tag TG. The HMD control section 141 calculates a relative position and a relative direction of the mobile machine 310 with respect to the moving area A on the basis of the position in the image P of the object specified in the image P and the position of the reference position marker CRA. The HMD control section 141 may perform calculation taking into account a zoom magnification of the zoom mechanism 337 of the mobbing machine camera 335. The reference vehicle position and the captured image data of the mobile machine 310 are associated by this processing. The reference vehicle position data 177 is generated.

The mobile machine 310 includes the GPS device 344. The mobile machine 310 can obtain information such as latitude, longitude, and altitude concerning the position of the mobile machine 310. However, for example, when the mobile machine 310 is moved in the indoor moving area A or when it is desired to detect the position of the mobile machine 310 at extremely high accuracy, there is a need to calculate the position of the mobile machine 310 with a method other than the GPS device 344. In this embodiment, a position and a direction of the mobile machine 310 at the time when imaging is performed are specified on the basis of captured image data captured by the mobile machine 310. In order to make it possible to specify the position and the direction, the moving area A, which is the real space, and the captured image data of the mobile machine 310 are associated. Therefore, the mobile machine 310 causes the user to perform operation by the indicator H and perform operation for aligning the reference position marker CRA with the reference tag CR. In this way, in a state in which the HMD control section 141 causes the image display section 20 to display the image P, the position is designated by the reference position marker CRA, which is a marker displayed on the image display section 20. Consequently, it is possible to highly accurately and easily perform association of the real space and the image P.

The HMD control section 141 generates the reference vehicle position data 177 and stores or overwrites the reference vehicle position data 177 in the HMD storing section 170 and, thereafter, starts detection of a movement amount of the vehicle 310 from the reference vehicle position (step S42). The HMD control section 141 integrates a movement amount and a moving direction of the mobile machine 310 involved in the elapse of time by performing, for example, processing for calculating differences of position information of the GPS device 344 detected by the mobile machine 310, a detection value of the posture sensor 348, and the like and processing for integrating the differences.

The HMD control section 141 calculates a position of the mobile machine 310 in the moving area A on the basis of the reference vehicle position and an integrated value of a movement amount and a moving direction of the mobile machine 310 from the reference vehicle position (step S43).

The HMD control section 141 displays, with the image display section 20, the calculated position of the mobile machine 310 and an imaging range imaged by the mobile machine 310 (step S44).

When calculating the position and the direction of the mobile machine 310, the HMD control section 141 may store the calculated position and/or direction of the mobile machine 310 and the captured image data of the mobile machine 310 in the HMD storing section 170 in association with each other. The HMD control section 141 may read out the captured image data of the mobile machine 310 from the HMD storing section 170 on the basis of the position and/or the direction of the mobile machine 310 and enables the captured image data to be displayed by the image display section 20. The HMD control section 141 may be capable of outputting the position and/or the direction of the mobile machine 310 and the captured image data of the mobile machine 310 to a personal computer or the like.

Figure 15:
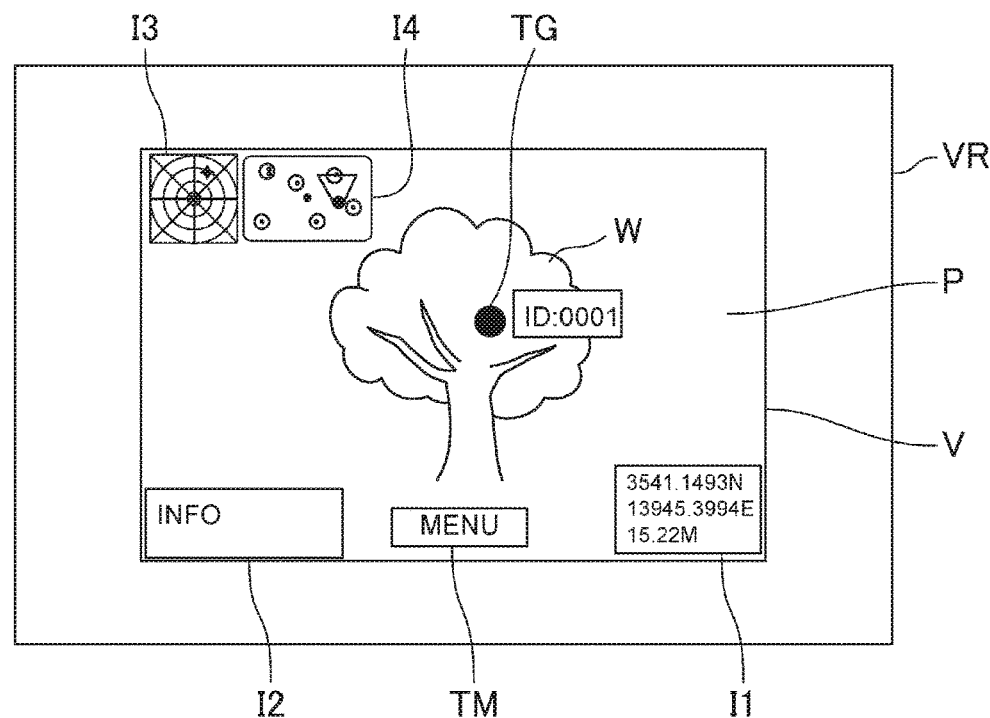
FIG. 15 is a diagram showing a display example of the HMD.

FIG. 15 is a diagram showing a display example of the HMD 100 and shows an example in which the position and the like of the mobile machine 310 are displayed together with a captured image of the mobile machine 310.

In FIG. 15, the image P based on captured image data captured by the mobile machine 310 from a side of one tree W is shown. In the display region V, the information display sections I1, I2, and I3 are disposed and the position and the like of the mobile machine 310 detected by the GPS device 344 are displayed. Further, an information display section I4 is disposed in the display region V. In the information display section I4, a relative position of the mobile machine 310 in the moving area A is designed and shown. In the information display section I4, an imaging range or an imaging direction imaged by the mobile machine 310 with the mobile machine camera 335 is designed and shown. The user can confirm, in the display region V, captured image data captured by the mobile machine 310 and learn, with the display of the information display section I4, from which position the captured image data is captured.

The HMD control section 141 determines on the basis of the intra-area tag data 176 or the like whether the tag TG is included in the imaging range of the mobile machine 310 calculated in step S43 (step S45). When the tag TG is not included in the imaging range (No in step S45), the HMD control section 141 shifts to step S47 explained below. When the tag TG is included in the imaging range (Yes in step S45), the HMD control section 141 displays ID of the tag TG to be superimposed on the position of the tag TG in the captured image data (step S46). The ID of the tag TG cannot be visually observed in the tag TG in the real space and the tag TG shown in the captured image data. However, the HMD control section 141 displays the ID to be superimposed on the tag TG, whereby a visual effect of AR (Augmented Reality) display is obtained. Consequently, the user can obtain information concerning the tag TG by viewing an image based on the captured image data.

The HMD control section 141 determines an end of the captured image mode is instructed (step S47). When the end of the captured image mode is instructed (Yes in step S47), the HMD control section 141 shifts to step S33 and switches the display mode to the normal mode. When the end of the captured image mode is not instructed (No in step S47), the HMD control section 141 determines whether to end the operation of the HMD 100 (step S48). When not to end the operation (No in step S48), the HMD control section 141 returns to step S39.

As explained above, the HMD 100 in the embodiment applied with the invention includes the image display section 20 worn on the head of the user and the HMD communication section 117 that receives a captured image transmitted by the mobile machine 310. The HMD 100 includes the position estimating section 155 that estimates a position of the mobile machine 310 in the real space on the basis of the captured image received by the HMD communication section 117. The HMD 100 includes the display control section 147 that causes the image display section 20 to display the captured image received by the HMD communication section 117 and information concerning the position of the mobile machine 310 estimated by the position estimating section 155.

With the HMD 100 and the control method for the HMD 100 applied with the invention, it is possible to display a captured image captured by the mobile machine 310 together with the position of the mobile machine 310. Consequently, the user can easily grasp correspondence between the position of the mobile machine 310 and the captured image. Therefore, for example, it is possible to perform the imaging after confirming the position of the mobile machine 310. Improvement of usefulness of the captured image captured by the mobile machine 310 can be expected.

The position estimating section 155 specifies, on the basis of a reference captured image obtained by the mobile machine 310 imaging the predetermined range, a position of the mobile machine 310 at the time when the reference captured image is captured, sets a reference vehicle position, and estimates a position of the mobile machine 310 on the basis of the reference vehicle position. Consequently, it is possible to easily estimate the position of the mobile machine 310 with, for example, a method of using a movement amount and a moving direction of the mobile machine 310 from the reference vehicle position.

The HMD communication section 117 receives position information transmitted by the mobile machine 310. The position estimating section 155 calculates a movement amount of the mobile machine 310 from the reference vehicle position on the basis of the position information received by the HMD communication section 117 to thereby estimate a position of the mobile machine 310. Consequently, it is possible to easily and accurately estimate the position of the mobile machine 310.

When receiving a captured image with the HMD communication section 117, the position estimating section 155 estimates a position of the mobile machine 310 on the basis of the received captured image and the reference captured image. Consequently, it is possible to easily estimate the position of the mobile machine 310 by using the captured image transmitted by the mobile machine 310.

The display control section 147 displays, as information concerning the position of the mobile machine 310, at least any one of an imaging direction and an imaging magnification of the mobile machine 310, the altitude of the mobile machine 310, and a movement amount from the reference vehicle position. Consequently, it is possible to display the imaging direction and the imaging magnification of the mobile machine 310, the altitude of the mobile machine 310, the movement amount from the reference vehicle position, and the like and appropriately provide information to the user of the display device.

The information concerning the position of the mobile machine 310 may include the mobile machine position information. Beside, the information may include mobile machine state information concerning an environment and a state of the mobile machine 310. The mobile machine state information may include information related to the position of the mobile machine 310. For example, the mobile machine state information may include information concerning peripheral facilities such as a facility name and a building name in the vicinity of or immediately below the mobile machine 310. The mobile machine state information may include information concerning the environment (weather, temperature, humidity, wind velocity, wind direction, precipitation, etc.) of the mobile machine 310.

The information concerning the position of the mobile machine 310 may include a processing result obtained by the mobile-machine control section 341 of the mobile machine 310 performing determination processing or analysis processing concerning a state around the mobile machine 310. That is, the information may include weather around the mobile machine 310 determined by the mobile-machine control section 341 and a prediction result of weather. The information may include information concerning preset monitoring target objects such as plants, buildings, and facilities located in the vicinity of the mobile machine 310. As a specific example, the information may include information indicating an optimum fruit picking period of trees or fruits in the vicinity of the mobile machine 310 or within the imaging range in an orchard and information indicating, for example, presence or absence of cement peeling of a monitoring target construction in a deterioration inspection of a construction such as a building, a bridge, or a road construction. The information may include, for example, a message for inquiring the user of the HMD 100 about the optimum fruit picking period, presence or absence of repair, or the like. It is also conceivable that the HMD 100 performs AR display of these kinds of information transmitted by the mobile machine 310. For example, as information indicating the position of the mobile machine 310, the HMD 100 displays information such as "10 m to the south and height of 3 m" based on a tag (the tag TG shown in the figure). Consequently, it is possible to easily join a place and information as assistance of work after picking work of fruits and disinfection work. The information is extremely useful. The information can also be used for, for example, a use for assisting a user in specifying a place of repair of a road or a building in a deterioration inspection of a construction. Further, the information can also be used in work-supportive work for associating the information concerning the position of the mobile machine 310 with movement of the mobile machine 310, associating a state like display of the information display section I4 shown in FIG. 15 and map display, and, when the user of the HMD 100 looks around the same place after imaging, and quite clearly displaying the place as an AR-superimposed image (or marker) to allow the user to immediately understand a target position.

In addition to the information concerning the position of the mobile machine 310, as machine body state information, the mobile machine 310 may transmit information such as a posture of the mobile machine 310 and remaining battery power and information such as radio wave intensity of a remote controller for operating a wireless device and the like besides a present position, altitude, speed, a moving direction, and the like. For example, it is also possible to specify a relative positional relation between the mobile machine 310 and the visual field direction of the HMD 100 according to radio wave intensity and the like of wireless communication from the mobile machine 310.

The HMD 100 includes the operation detecting section 157 that designates a position in the captured image received by the HMD communication section 117. The position estimating section 155 estimates, on the basis of the position of the mobile machine 310 at the time when the captured image is captured, a position in the real space corresponding to the position designated by the operation detecting section 157. Consequently, by estimating the position in the real space corresponding to the position in the captured image, it is possible to provide information concerning correspondence between the captured image and the real space to the user.

The position estimating section 155 sets, as a marker position, a position in the real space estimated according to the position designated by the detection control section 151. The display control section 147 causes the image display section 20 to display the marker position. Consequently, it is possible to provide, with the image display section 20, information concerning correspondence between the captured image and the real space to the user.

When the captured image is received by the HMD communication section 117, the position estimating section 155 estimates a relative position of the marker position in the received captured image. The display control section 147 causes, on the basis of the relative position estimated by the position estimating section 155, the image display section 20 to display the captured image received by the HMD communication section 117 and a display object indicating the marker position. Consequently, by displaying the display object indicating the designated position together with the captured image, it is possible to provide the information concerning the correspondence between the captured image and the real space to the user.

The HMD 100 includes the detection control section 151 that receives operation. The HMD 100 transmits, with the HMD communication section 117, control information for controlling the mobile machine 310 on the basis of the operation received by the detection control section 151. Consequently, it is possible to reflect, on control of the mobile machine 310, operation on the display device. It is possible to achieve improvement of operability of the mobile machine 310.

The HMD 100 includes the six-axis sensor 235 and/or the magnetic sensor 237 as the movement sensor that detects a movement of the image display section 20. The detection control section 151 of the HMD 100 receives operation by the movement of the image display section 20 on the basis of a detection value of the movement sensor. Consequently, it is possible to reflect the operation by the movement of the image display section 20 on the control of the mobile machine 310. It is possible to achieve improvement of the operability of the mobile machine 310.

Further, in the mobile machine control system 1, when the detection control section 151 detects position indication operation while the image P is displayed in the captured image mode, a virtual marker corresponding to an indicated position may be set. In this case, the HMD control section 141 detects a designated position in the image P and specifies a relative position of the virtual marker with respect to the moving area A on the basis of the position and the direction of the mobile machine 310 at the time when captured image data corresponding to the image P is captured. Further, the HMD control section 141 stores the specified position in the HMD storing section 170. In this configuration, the position or the positions of one or a plurality of virtual markers may be displayed, for example, on the information display section I4.

As an application example of the mobile machine control system 1, there is, for example, a use in which, in a field (a farm) where agricultural products such as vegetables and fruits are grown, growing states and the like of the agricultural products are monitored with captured image data of the mobile machine 310. In this example, the moving area A can be set as an entire farm field or a segmented part of the farm field. The tags TG can be attached to trees, which are agricultural products present in the farm field, fixtures indicating the trees, or set objects such as posts. In this case, it is possible to visually observe states of the agricultural products on the basis of the captured image data of the mobile machine 310. It is possible to learn a range in which the captured image data is captured and the position the mobile machine 310. Therefore, in a farm field where large numbers of trees and agricultural products are present, it is possible to thoroughly and accurately confirm states of the agricultural product with visual observation.

As another application example of the mobile machine control system 1, there is a use in which states of constructions such as buildings, roads, and bridges and movable articles are inspected and managed by visual observation.

The mobile machine camera 335 of the mobile machine 310 is not limited to a camera that performs imaging with visible light and may be a component that performs imaging with invisible light such as infrared light or a sensor that uses ultrasound or the like. For example, a light source that irradiates infrared light may be mounted on the mobile machine 310. Consequently, it is possible to detect sugar contents of agricultural products using the captured image data of the mobile machine 310. When a construction is inspected, for example, it is possible to perform flaw examination of the target construction and perform measurement of temperature using a thermograph technique.

As still another application example, there is a use in which, in a large facility including a large number of seats such as a stadium, a congestion degree in each place is determined using captured image data of the mobile machine 310 or a state of congestion in a road is determined using captured image data of the mobile machine 310.

When a map is displayed in the information display section I3 as shown in FIGS. 12, 14, 15, and the like, a moving direction of the mobile machine 310, that is, information indicating from which direction to which direction the mobile machine 310 is moving may be additionally displayed. For example, an image of a condensation trail may be added to a map image displayed in the information display section I3. Further, in the information display section I3 and other places in the display region V, AR display adjusted to the position of the mobile machine 310 in the real space may be performed. As a specific example of the AR display, a form may be used in which an additional image having directivity is added and displayed, for example, a shadow is added or an arrow is added after the image of the condensation trail or the traveling direction of the mobile machine 310 in the real space. There is an advantage that operation concerning the mobile machine 310 is eased.

In the embodiment explained above, the operation detecting section 157 detects the movement of the image display section 20 or the operation on the image display section 20. The command generating section 159 is capable of generating, according to the operation, a command for instructing the routine operation. The operation detecting section 157 may detect operation by a device other than the HMD 100. For example, the user uses an operation device of a finger ring type worn on a finger. For example, the user uses an operation device of a wristwatch type worn on an arm. Each of the operation devices may include the movement sensors such as the six-axis sensor 235 and the magnetic sensor 237 and a transmitting section that transmits detection values of the movement sensors to the HMD 100. In this case, if the operation device and the HMD communication section 117 are capable of communicating with each other through the Bluetooth, the operation detecting section 157 can detect operation for moving the operation device. In this case, when a movement of the operation device is a preset form, the operation detecting section 157 may generate a command for instructing the routine operation.

The operation detecting section 157 may detect a command instruction by voice collected by the microphone 63. That is, when a pattern of voice detected by the sound interface 182 corresponds to a preset pattern, the detection control section 151 may generate a command for instructing the routine operation.

When the image P based on the image data received from the remote controller 350 is displayed by the display control section 147, the HMD control section 141 may display the image P or the tags TG included in the image P in a form in which a stereoscopic view is possible. This configuration can be realized by the image processing section 145 processing images to cause a parallax between an image displayed by the right display unit 22 and an image displayed by the left display unit 24. For example, when AR display of the ID of the tag TG shown in FIG. 15 is performed, the ID can be displayed with a parallax added. In this case, it is possible to show an image to the user of the HMD 100 while causing the user to recalling a real sense of reality.

When the HMD 100 is capable of performing wireless data communication with other HMDs 100, the HMD 100 may transmit image data received by the HMD 100 from the remote controller 350 or data obtained by including, for example, data indicating the position of the mobile machine 310 in the image data to the other HMDs 100. In this case, the user of the HMD 100 can provide the captured image data of the mobile machine 310 and information concerning the position of the mobile machine 310 to users of the other HMDs 100.

Like the indicator H shown in the figures, besides a finger, a hand, and the like of a human, an indicator may be a remote control device that remotely operates the HMD 100, a pointing stick, a pen, or the like. The detection control section 151 may detect operation of a device such as an air mouse. As detecting means, a captured image of the HMD camera 61 can be used. A device including a light emitting body such as an LED can also be used as the indicator.

The HMD control section 141 may output information shown in the information display sections I1, I2, I3, and I4 displayed in the display region V from the right earphone 32 and the left earphone 34 by voice. The voice may be output according to the position of the mobile machine 310 during the flight of the mobile machine 310.

Note that the invention is not limited to the configuration in the embodiment and can be carried out in various forms without departing from the spirit of the invention.

For example, in the embodiment, the configuration is illustrated in which the control device 10 is connected to the image display section 20 by wire. However, the invention is not limited to this. A configuration may be adopted in which the image display section 20 is connected to the control device 10 by radio. As a wireless communication scheme in this case, a scheme illustrated as a communication scheme to which the HMD communication section 117 is adapted may be adopted. Other communication schemes may be adopted.

A part of the functions of the control device 10 may be provided in the image display section 20. The control device 10 may be realized by a plurality of devices. For example, instead of the control device 10, a wearable device attachable to the body or clothes of the user or an ornament worn by the user may be used. The wearable device in this case may be, for example, a watch-type device, a finger ring-type device, a laser pointer, a mouse, an air mouse, a game controller, or a pen-type device.

Further, in the embodiment, the configuration is illustrated in which the image display section 20 and the control device 10 are separated and connected via the connection cable 40. The invention is not limited to this. A configuration may be adopted in which the control device 10 and the image display section 20 are integrated and worn on the head of the user.

In the embodiment, the configuration in which the user visually recognizes the outside scene through the display section is not limited to the configuration in which the right light guide plate 26 and the left light guide plate 28 transmit the external light. For example, the invention can also be applied to a display device that displays an image in a state in which the outside scene cannot be visually recognized. Specifically, the invention can be applied to a display device that displays, for example, a captured image of the HMD camera 61, an image and a CG generated on the basis of the captured image, and a video based on video data stored in advance and video data input from the outside. The display device of this type includes a display device of a so-called closed type that cannot visually recognize the outside scene. For example, if a configuration is adopted in which a combined image obtained by combining an image of an outside scene imaged by the HMD camera 61 and a display image is displayed by the image display section 20, even if the image display section 20 does not transmit the external light, it is possible to visually recognizably display the outside scene and the image to the user. The invention can be naturally applied to such a display device of a so-called video see-through type.

In the embodiment, as an example of the vehicle, the mobile machine 310, which is the unmanned flying object and the quadricopter, is explained. The vehicle is not limited to this. The vehicle can also be applied to various unmanned vehicles, which are remotely operated and automatically driven, such as an automobile, a ship, a robot, and toys of the automobile, the ship, and the robot. The vehicle in this case only has to include a camera that captures an image. Examples of the vehicle include vehicles such as a helicopter, an airplane, a rocket, a submarine, an artificial satellite, a vehicle such as a bus, and a railroad vehicle. The vehicle may be manned or unmanned and may be loaded with a cargo. The vehicle may be an apparatus piloted and operated in an unmanned state and may be configured to transport people. The vehicle may be an additional apparatus such as a crane unit incidental to a truck (an automobile for cargo transportation). The vehicle can be applied to apparatuses used in the agriculture, the forestry, the fishery, the mining industry, and the like such as vehicles for work and apparatuses for work (e.g., for construction sites) such as a power shovel, a snowplow, a lawn mower, a tractor, a bulldozer, a combine harvester, a cultivator, a rice planting machine, a crop-dusting machine. These vehicles may be apparatuses remotely operated and used or may be apparatuses that a person rides and operates.

The invention can also be applied to a display device that does not perform processing such as the AR display for displaying an image to be superimposed on the real space as explained in the embodiment, MR (Mixed Reality) display for combining a captured image in the real space and a virtual image, or VR (Virtual Reality) display for displaying a virtual image. For example, a display device that displays video data or an analog video signal input from the outside is naturally included as an application target of the invention.

For example, instead of the image display section 20, an image display section of another system such as an image display system worn like a cap may be adopted. The image display section only has to include a display section that displays an image corresponding to the left eye LE of the user and a display section that displays an image corresponding to the right eye RE of the user. The display device according to the invention may be configured as a head mounted display mounted on a vehicle such as an automobile or a plane. For example, the display device may be configured as a head mounted display incorporated in a body protector such as a helmet. In this case, a portion for positioning a position with respect to the body of a user and a portion positioned with respect to the portion can be set as wearing sections.

In the embodiment, the configuration in which a virtual image is formed by the half mirrors 261 and 281 in a part of the right light guide plate 26 and the left light guide plate 28 is illustrated as the optical system that guides image light to the eyes of the user. The invention is not limited to this. A configuration may be adopted in which an image is displayed in a display region having an area occupying the entire or most of the right light guide plate 26 and the left light guide plate 28. In this case, processing for reducing the image may be included in operation for changing a display position of the image.

Further, the optical elements of the invention are not limited to the right light guide plate 26 and the left light guide plate 28 including the half mirrors 261 and 281 and only have to be optical components that make image light incident on the eyes of the user. Specifically, a diffraction grating, a prism, and a holography display section may be used.

At least a part of the functional blocks shown in FIGS. 2, 7, 8, and the like may be realized by hardware or may be realized by cooperation of hardware and software and are not limited to the configuration in which the independent hardware resources are disposed as shown in the figures. The computer programs to be executed by the HMD control section 141 may be stored in the nonvolatile storing section 121 or other storage devices (not shown in the figure) in the control device 10. The HMD control section 141 may acquire computer programs stored in an external device via the HMD communication section 117 and the external connector 184 and execute the computer programs. Among the components formed in the control device 10, the operation section 110 may be formed as a user interface (UI). The components formed in the control device 10 may be redundantly formed in the image display section 20. For example, a processor similar to the main processor 140 may be disposed in the image display section 20. The main processor 140 included in the control device 10 and the processor of the image display section 20 may execute separately divided functions.

The entire disclosure of Japanese Patent Application No. 2017-012756, filed Jan. 27, 2017 is expressly incorporated by reference herein.

What is claimed is:

1. A display device comprising:
a display worn on a head of a user;
a communicator configured to receive a captured image transmitted by a vehicle; and
a processor programmed to:
estimate a position of the vehicle in a real space based on the captured image received by the communicator, by:
specifying, based on a reference captured image of a predetermined range imaged by the vehicle, a position of the vehicle at a time when the reference captured image is captured, thereby setting a reference vehicle position; and
estimating the position of the vehicle based on the reference vehicle position; and
cause the display to display:
the captured image received by the communicator, and
at least one of: an imaging magnification, an altitude of the vehicle, and a movement amount from the reference vehicle position.

2. The display device according to claim 1, wherein
the communicator receives position information transmitted by the vehicle, and
the processor is programmed to estimate the position of the vehicle by calculating a movement amount of the vehicle from the reference vehicle position based on the position information received by the communicator.

3. The display device according to claim 1, wherein, when the captured image is received by the communicator, the processor is programmed to estimate the position of the vehicle based on the received captured image and the reference captured image.

4. The display device according to claim 1, wherein the processor is programmed to:
designate a position in the captured image received by the communicator; and
estimate, based on the position of the vehicle at a time when the captured image is captured, a position in the real space corresponding to the designated position.

5. The display device according to claim 4, wherein the processor is programmed to:
set, as a marker position, the estimated position in the real space corresponding to the designated position; and
cause the display to display the marker position.

6. The display device according to claim 5, wherein the processor is programmed to:
when the captured image is received by the communicator, estimate a relative position of the marker position in the received captured image; and
cause, based on the estimated relative position, the display to display the captured image received by the communicator and a display object indicating the marker position.

7. The display device according to claim 1, further comprising:
a receiver configured to receive operation,
wherein the display device transmits, with the communicator, control information for controlling the vehicle based on the operation received by the receiver.

8. The display device according to claim 7, further comprising:
a movement sensor configured to detect a movement of the display,
wherein the receiver receives operation by the movement of the display device based on a detection value of the movement sensor.

9. A control method for a display device including a display worn on a head of a user, the control method comprising:
receiving a captured image transmitted by a vehicle;
estimating a position of the vehicle in a real space based on the received captured image, by:
specifying, based on a reference captured image of a predetermined range imaged by the vehicle, a position of the vehicle at a time when the reference captured image is captured, thereby setting a reference vehicle position; and estimating the position of the vehicle based on the reference vehicle position; and displaying, on the display:

the captured image received from the vehicle, and at least one of: an imaging magnification, an altitude of the vehicle, and a movement amount from the reference vehicle position.

10. The display device according to claim 1, wherein the reference captured image contains a reference tag which is located in the real space.

11. The method according to claim 9, further comprising:

placing a reference tag in the real space before estimating the position of the vehicle, wherein the reference captured image contains the reference tag.

12. The display device according to claim 1, wherein the processor is programmed to cause the display to display a movement amount from the reference vehicle position.

* * * * *